United States Patent
Saito et al.

(10) Patent No.: US 10,868,448 B2
(45) Date of Patent: Dec. 15, 2020

(54) DYNAMO-ELECTRIC MACHINE AND VEHICLE

(71) Applicant: HITACHI AUTOMOTIVE SYSTEMS, LTD., Ibaraki (JP)

(72) Inventors: Yasuyuki Saito, Hitachinaka (JP); Yuji Kano, Hitachinaka (JP); Takayuki Koizumi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/069,798

(22) PCT Filed: Dec. 7, 2016

(86) PCT No.: PCT/JP2016/086293
§ 371 (c)(1),
(2) Date: Jul. 12, 2018

(87) PCT Pub. No.: WO2017/122463
PCT Pub. Date: Jul. 20, 2017

(65) Prior Publication Data
US 2019/0027977 A1    Jan. 24, 2019

(30) Foreign Application Priority Data
Jan. 12, 2016   (JP) .................. 2016-003169

(51) Int. Cl.
| | |
|---|---|
| H02K 3/04 | (2006.01) |
| H02K 1/16 | (2006.01) |
| H02K 3/28 | (2006.01) |
| H02K 21/14 | (2006.01) |
| H02K 3/12 | (2006.01) |
| H02K 3/48 | (2006.01) |
| H02P 27/06 | (2006.01) |

(52) U.S. Cl.
CPC .............. *H02K 1/165* (2013.01); *H02K 3/04* (2013.01); *H02K 3/12* (2013.01); *H02K 3/28* (2013.01);
(Continued)

(58) Field of Classification Search
CPC ............ H02K 3/28; H02K 1/276; H02K 3/12; H02K 1/165; H02K 15/066; H02K 3/00;
(Continued)

(56) References Cited

U.S. PATENT DOCUMENTS 6,291,918 B1 * 9/2001 Umeda .................. H02K 1/165
                                                         310/215
6,373,163 B1 * 4/2002 Oohashi .................. H02K 3/12
                                                         310/184
(Continued)

FOREIGN PATENT DOCUMENTS

| JP | 2009-011116 A | 1/2009 |
| JP | 2012-029370 A | 2/2012 |
| JP | 2014-221003 A | 11/2014 |

OTHER PUBLICATIONS

International Search Report dated Apr. 4, 2017 of International Application No. PCT/JP/086293.

*Primary Examiner* — Rina I Duda
(74) *Attorney, Agent, or Firm* — Volpe Koenig

(57) ABSTRACT

A rotating electrical machine capable of achieving a high torque and low noise is provided. In a stator for a rotating electrical machine in which six or more slot conductors are inserted through one slot, the stator for a rotating electrical machine straddles slots such that a slot pitch of a jumper wire connecting round windings having different positions in a radial direction has at least two kinds or more different slot pitches.

7 Claims, 26 Drawing Sheets

(52) U.S. Cl.
CPC ............... *H02K 3/48* (2013.01); *H02K 21/14* (2013.01); *H02P 27/06* (2013.01)

(58) Field of Classification Search
CPC .. H02K 3/04; H02K 3/14; H02K 3/18; H02K 3/20; H02K 3/46; H02K 3/48; H02K 3/50; H02K 3/52; H02K 3/521
USPC .......................................................... 310/207
See application file for complete search history.

(56) References Cited

U.S. PATENT DOCUMENTS

| | | | |
|---|---|---|---|
| 6,979,926 B2* | 12/2005 | Ogawa ..................... | H02K 3/12 310/179 |
| 6,995,492 B1* | 2/2006 | Kouda ..................... | H02K 3/28 310/179 |
| 7,034,428 B2* | 4/2006 | Cai .......................... | H02K 3/12 310/198 |
| 7,242,124 B2* | 7/2007 | Ogawa ..................... | H02K 3/12 310/179 |
| 8,407,881 B2* | 4/2013 | Naganawa ............ | H02K 15/066 29/596 |
| 9,166,451 B2* | 10/2015 | Han ........................ | B60L 50/51 |
| 2002/0145353 A1* | 10/2002 | Kimura .................. | H02K 1/276 310/156.57 |
| 2009/0001841 A1 | 1/2009 | Naganawa et al. | |
| 2012/0161569 A1* | 6/2012 | Hisada ............... | H02K 15/0081 310/201 |
| 2013/0113330 A1 | 5/2013 | Saito et al. | |
| 2014/0361646 A1* | 12/2014 | Saito ....................... | H02K 3/28 310/51 |
| 2015/0207374 A1* | 7/2015 | Tsuiki ..................... | H02K 3/12 310/202 |

* cited by examiner

DYNAMO-ELECTRIC MACHINE AND VEHICLE

TECHNICAL FIELD

The present invention relates to a rotating electrical machine and a vehicle.

BACKGROUND ART

A technique as described in PTL 1 is known as winding techniques of rotating electrical machines used to drive vehicles.

CITATION LIST

Patent Literature

PTL 1: JP 2012-29370 A

SUMMARY OF INVENTION

Technical Problem

Meanwhile, a rotating electrical machine mounted in an electric vehicle or the like is required to cause low noise while generating a high torque. Thus, an object of the present invention is to provide a rotating electrical machine with a high torque and low noise.

Solution to Problem

According to a first aspect of the present invention, a rotating electrical machine includes: a stator core having a plurality of slots formed therein; a stator winding having a plurality of round windings wound in a wave winding such that a winding conductor is inserted through each of the plurality of slots in six layers or more; and a rotator provided to be rotatable with respect to the stator core. The stator winding has a plurality of jumper wires connecting two of the round windings inserted through different layers. When the number of slots per pole is N, the plurality of jumper wires include a jumper wire having a straddling amount of (N+1) slot pitches at the time of connecting the two round windings while straddling the slots and a jumper wire having a straddling amount of $\{(N+1)\pm1\}$ slot pitches. According to a second aspect of the present invention, a vehicle includes: the rotating electrical machine; a battery that supplies DC power; and a conversion device that converts the DC power of the battery into AC power and supplies the AC power to the rotating electrical machine, and uses a torque of the rotating electrical machine as a driving force.

Advantageous Effects of Invention

According to the present invention, it is possible to achieve the high torque and low noise of the rotating electrical machine.

DESCRIPTION OF EMBODIMENTS

Figure 1:
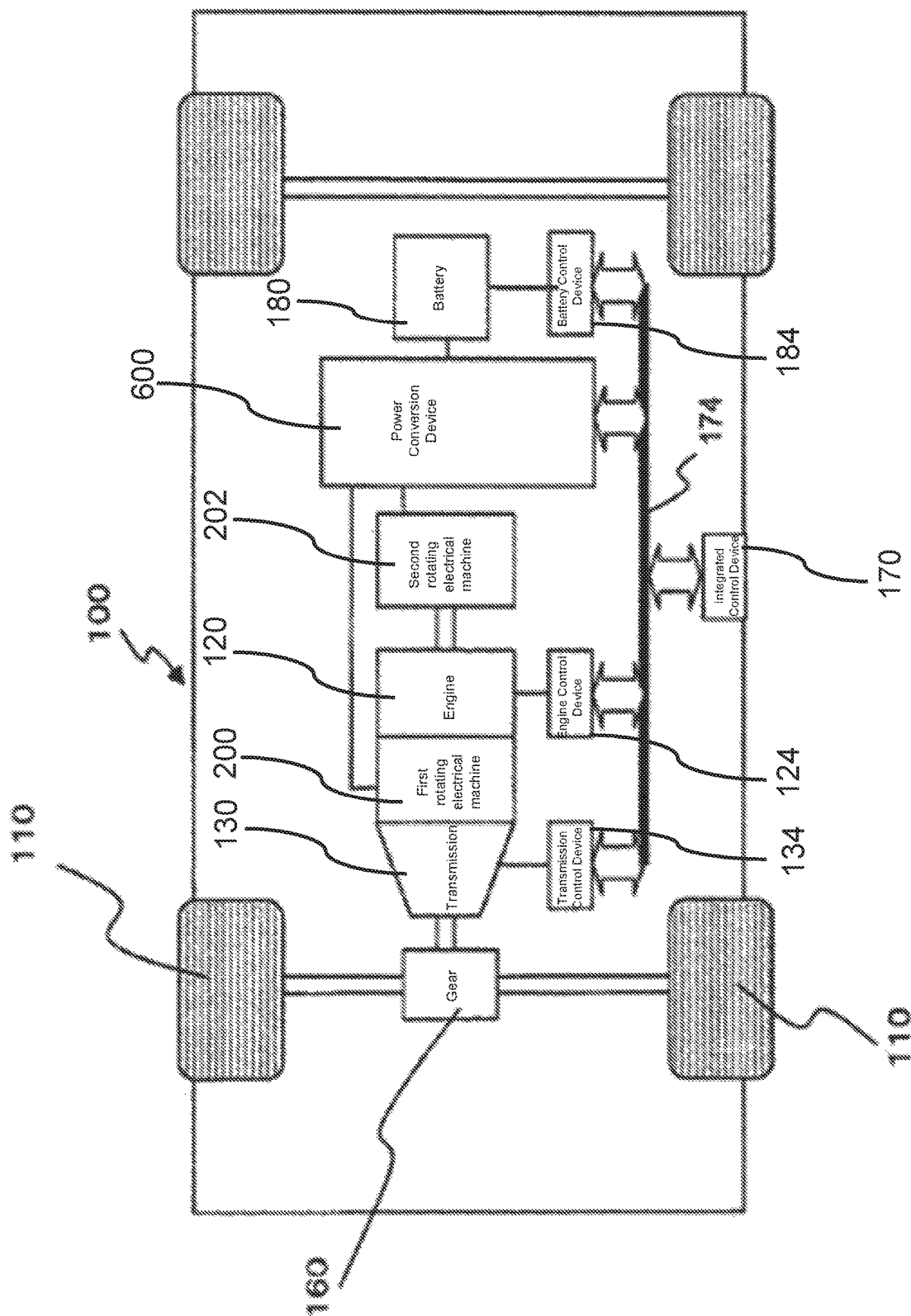
FIG. 1 is a diagram illustrating a schematic configuration of a hybrid electric vehicle.

FIG. 1 is a diagram illustrating a schematic configuration of a hybrid electric vehicle equipped with a rotating electrical machine according to one embodiment of the present invention. An engine 120, a first rotating electrical machine 200, a second rotating electrical machine 202, and a battery 180 are mounted on a vehicle 100. The battery 180 supplies DC power to the rotating electrical machines 200 and 202 via a power conversion device 600 when a driving force using the rotating electrical machines 200 and 202 is required, and receives DC power from the rotating electrical machines 200 and 202 at the time of regenerative traveling. The transfer of the DC power between the battery 180 and the rotating electrical machines 200 and 202 is carried out via the power conversion device 600. In addition, a battery that supplies low-voltage power (for example, 14-volt power) is mounted on the vehicle although not illustrated, and the DC power is supplied to a control circuit to be described below.

Rotation torques by the engine 120 and the rotating electrical machines 200 and 202 are transmitted to front wheels 110 via a transmission 130 and a differential gear 160. The transmission 130 is controlled by a transmission control device 134. The engine 120 is controlled by an engine control device 124. The battery 180 is controlled by a battery control device 184. The transmission control device 134, the engine control device 124, the battery control device 184, the power conversion device 600, and an integrated control device 170 are connected to each other through a communication line 174.

The integrated control device 170 is a control device of a higher order than the transmission control device 134, the engine control device 124, the power conversion device 600, and the battery control device 184. The integrated control device 170 receives information representing each state of the transmission control device 134, the engine control device 124, the power conversion device 600, and the battery control device 184 from each control device through the communication line 174. The integrated control device 170 calculates a control command of each control device based on the acquired information thereof. The calculated control command is transmitted to each control device through the communication line 174.

The high-voltage battery 180 is configured using a secondary battery such as a lithium ion battery and a nickel-metal hydride battery and outputs high-voltage DC power of 250 volts to 600 volts or higher. The battery control device 184 outputs a charging/discharging state of the battery 180 and a state of each unit cell battery constituting the battery 180 to the integrated control device 170 through the communication line 174.

When determining charging of the battery 180 is necessary based on the information from the battery control device 184, the integrated control device 170 issues an instruction of a power generation operation to the power conversion device 600. In addition, the integrated control device 170 mainly performs management of output torques of the engine 120 and the rotating electrical machines 200 and 202, and a process of calculating a total torque of the output torque of the engine 120 and the output torques of the rotating electrical machines 200 and 202 and a torque distribution ratio, and transmits the control command based on a result of the calculation process to the transmission control device 134, the engine control device 124, and the power conversion device 600. The power conversion device 600 controls the rotating electrical machines 200 and 202 to generate a torque output or generated power as commanded based on a torque command from the integrated control device 170.

The power conversion device 600 is provided with a power semiconductor that constitutes an inverter for driving the rotating electrical machines 200 and 202. The power conversion device 600 controls a switching operation of the power semiconductor based on the command from the integrated control device 170. The rotating electrical machines 200 and 202 are operated as electric motors or generator by the switching operation of the power semiconductor.

When the rotating electrical machines 200 and 202 are operated as the electric motors, DC power from the high-voltage battery 180 is supplied to a direct current terminal of the inverter in the power conversion device 600. The power conversion device 600 controls the switching operation of the power semiconductor to convert the supplied DC power into three-phase AC power and supplies the converted power to the rotating electrical machines 200 and 202. On the other hand, when the rotating electrical machines 200 and 202 are operated as the generators, rotors of the rotating electrical machines 200 and 202 are driven to rotate by a rotation torque applied from the outside, and three-phase AC power is generated in stator windings of the rotating electrical machines 200 and 202. The generated three-phase AC power is converted into DC power by the power conversion device 600, and the battery 180 is charged as the DC power is supplied to the high-voltage battery 180.

Figure 2:
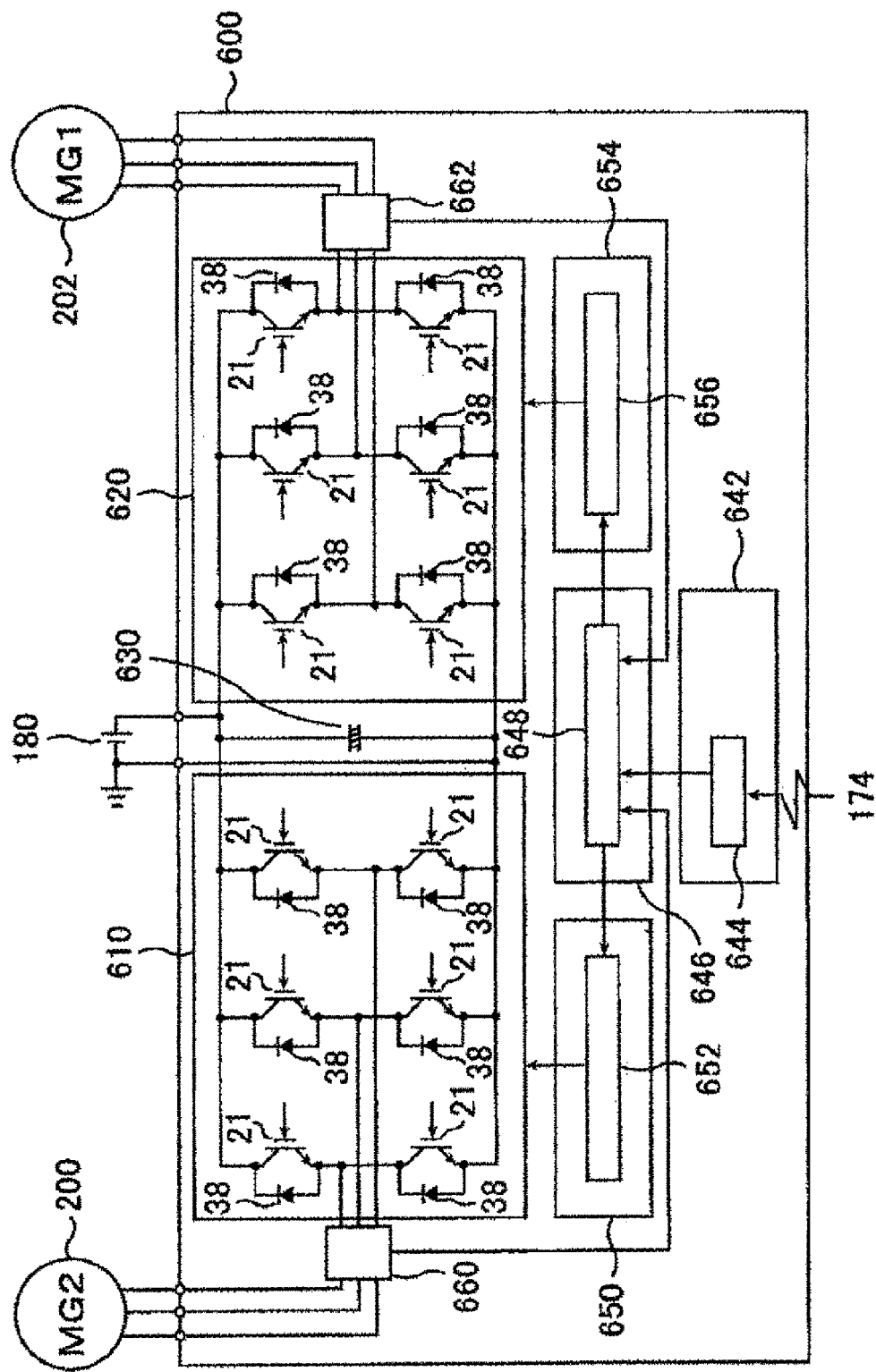
FIG. 2 is a circuit diagram of a power conversion device.

FIG. 2 illustrates a circuit diagram of the power conversion device 600 of FIG. 1. The power conversion device 600 is provided with a first inverter device for the rotating electrical machine 200 and a second inverter device for the rotating electrical machine 202. The first inverter device includes a power module 610, a first drive circuit 652 that controls the switching operation of each power semiconductor 21 of the power module 610, and a current sensor 660 that detects a current in the rotating electrical machine 200. The drive circuit 652 is provided on a drive circuit board 650.

On the other hand, the second inverter device includes a power module 620, a second drive circuit 656 that controls the switching operation of each power semiconductor 21 in the power module 620, and a current sensor 662 that detects a current of the rotating electrical machine 202. The drive circuit 656 is provided on a drive circuit board 654. The control circuit 648 provided on a control circuit board 646, a capacitor module 630, and a transmission/reception circuit 644 mounted on a connector board 642 are used in common by the first inverter device and the second inverter device.

The power modules 610 and 620 are operated by drive signals output from the corresponding drive circuits 652 and 656, respectively. When the rotating electrical machines 200 and 202 are operated as the electric motors, each of the power modules 610 and 620 converts DC power supplied from the battery 180 into three-phase AC power, and supplies the converted power to the stator windings which are armature windings of the rotating electrical machines 200 and 202 corresponding to the power. In addition, when the rotating electrical machines 200 and 202 are operated as the generators, the power modules 610 and 620 convert the AC power induced in the stator windings of the rotating electrical machines 200 and 202 to DC power and supply the converted power to the high-voltage battery 180.

Each of the power modules 610 and 620 has a three-phase bridge circuit as illustrated in FIG. 2, and each of series circuits corresponding to three phases is electrically connected in parallel between a positive electrode side and a negative electrode side of the battery 180. Each of the series circuits includes the power semiconductor 21 constituting an upper arm and the power semiconductor 21 constituting a lower arm, and these power semiconductors 21 are connected in series. The power module 610 and the power module 620 have substantially the same circuit configuration as illustrated in FIG. 2, and the power module 610 will be described as a representative herein.

In the present embodiment, an insulated gate bipolar transistor (IGBT) 21 is used as a power semiconductor element for switching. The IGBT 21 includes three electrodes of a collector electrode, an emitter electrode, and a gate electrode. A diode 38 is electrically connected between the collector electrode and the emitter electrode of the IGBT 21. The diode 38 includes two electrodes of a cathode electrode and an anode electrode, and the cathode electrode and the anode electrode are electrically connected to the collector electrode of the IGBT 21 and the emitter electrode of the IGBT 21, respectively, such that a direction from the emitter electrode to the collector electrode of the IGBT 21 becomes a forward direction.

Incidentally, a metal oxide semiconductor field effect transistor (MOSFET) may be used as the power semiconductor element for switching. The MOSFET includes three electrodes of a drain electrode, a source electrode, and a gate electrode. In the case of the MOSFET, a parasite diode having a direction from the drain electrode to the source electrode as a forward direction is provided between the source electrode and the drain electrode, and thus it is unnecessary to provide the diode 38 as illustrated in FIG. 2.

The arm of each phase is configured as the emitter electrode of the IGBT 21 and the collector electrode of the IGBT 21 are electrically connected in series. Incidentally, only one IGBT of each of the upper and lower arms of each phase is illustrated in the present embodiment, but current capacity to be controlled is large, and thus, a plurality of IGBTs are practically configured to be electrically connected in parallel. Hereinafter, a single power semiconductor will be described in order to simplify the description.

In the example illustrated in FIG. 2, each of the upper and lower arms of each phase is constituted by three IGBTs. The collector electrodes of the IGBTs 21 of the respective upper arms of the respective phases are electrically connected to the positive electrode side of the battery 180, and the source electrodes of the IGBTs 21 of the respective lower arms of the respective phases are electrically connected to the negative electrode side of the battery 180. A middle point of each arm of each phase (a connection part between the emitter electrode of the IGBT on the upper arm side and the collector electrode of the IGBT on the lower arm side) is electrically connected to the armature winding (stator winding) of the corresponding phase of the corresponding rotating electrical machines 200 and 202.

The drive circuits 652 and 656 constitute drive units for controlling the corresponding power modules 610 and 620, respectively, and generate drive signals for driving the IGBTs 21 based on control signals output from the control circuit 648. The drive signals generated in the respective drive circuits 652 and 656 are output to gates of the respective power semiconductor elements of the corresponding power modules 610 and 620. Each of the drive circuits 652 and 656 is provided with six integrated circuits that generate drive signals to be supplied to gates of the respective upper and lower arms of the respective phases, and the six integrated circuits are formed as one block.

The control circuit 648 constitutes a control unit in each of the power modules 610 and 620, and is configured using a microcomputer that calculates control signals (control values) for operating (turning on or off) the plurality of power semiconductor elements for switching. Torque command signals (torque command values) from a host control unit, sensor outputs from the current sensors 660 and 662, and sensor outputs from rotation sensors mounted on the rotating electrical machines 200 and 202 are input to the control circuit 648. The control circuit 648 calculates a control value based on these input signals, and outputs a control signal for controlling a switching timing to the drive circuits 652 and 656.

The transmission/reception circuit 644 mounted on the connector board 642 is configured for electrical connection between the power conversion device 600 and an external control device, and performs transmission and reception of information with another device through the communication line 174 of FIG. 1. The capacitor module 630 constitutes a smoothing circuit for suppressing a fluctuation in DC voltage generated by the switching operation of IGBT 21, and thus, is electrically connected in parallel to a terminal on a DC side in the first power module 610 and the second power module 620.

Figure 3:
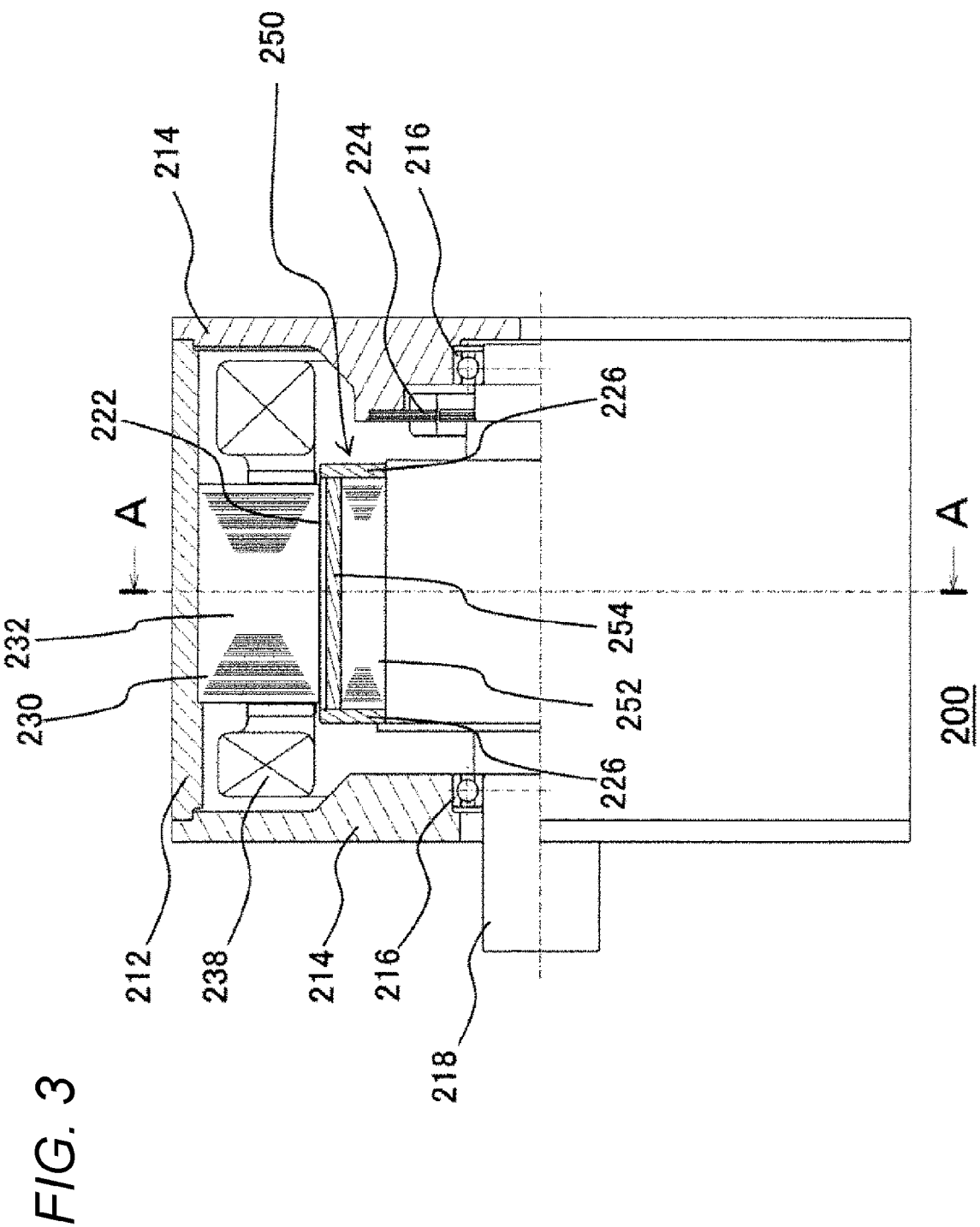
FIG. 3 is a view illustrating a cross section of a rotating electrical machine.

FIG. 3 is a cross-sectional view of the rotating electrical machine 200 of FIG. 1. Incidentally, the rotating electrical machine 200 and the rotating electrical machine 202 have substantially the same structure, and the structure of the rotating electrical machine 200 will be described hereinafter as a representative example. However, the structure to be illustrated hereinafter is not necessarily adopted in both of the rotating electrical machines 200 and 202, and may be adopted in only one of the rotating electrical machines 200 and 202.

A stator 230 is held inside a housing 212, and the stator 230 includes a stator core 232 and a stator winding 238. A rotor 250 is rotatably held at the inner circumferential side of the stator core 232 with a void 222. The rotor 250 includes a rotor core 252 fixed to a shaft 218, a permanent magnet 254, and a non-magnetic wear plate 226. The housing 212 has a pair of end brackets 214 each of which is provided with a bearing 216, and the shaft 218 is rotatably held by these bearings 216.

The shaft 218 is provided with a resolver 224 that detects positions of poles and rotation speed of the rotor 250. An output from the resolver 224 is introduced into the control circuit 648 illustrated in FIG. 2. The control circuit 648 outputs the control signal to the drive circuit 652 based on the introduced output. The drive circuit 652 outputs the drive signal to the power module 610 based on the control signal. The power module 610 performs the switching operation based on the control signal to convert DC power supplied from the battery 180 into three-phase AC power. The three-phase AC power is supplied to the stator winding 238 illustrated in FIG. 3 and a rotating magnetic field is generated in the stator 230. A frequency of the three-phase alternating current is controlled based on an output value by the resolver 224, and a phase of the three-phase alternating current with respect to the rotor 250 is also controlled based on the output value of the resolver 224.

Figure 4:
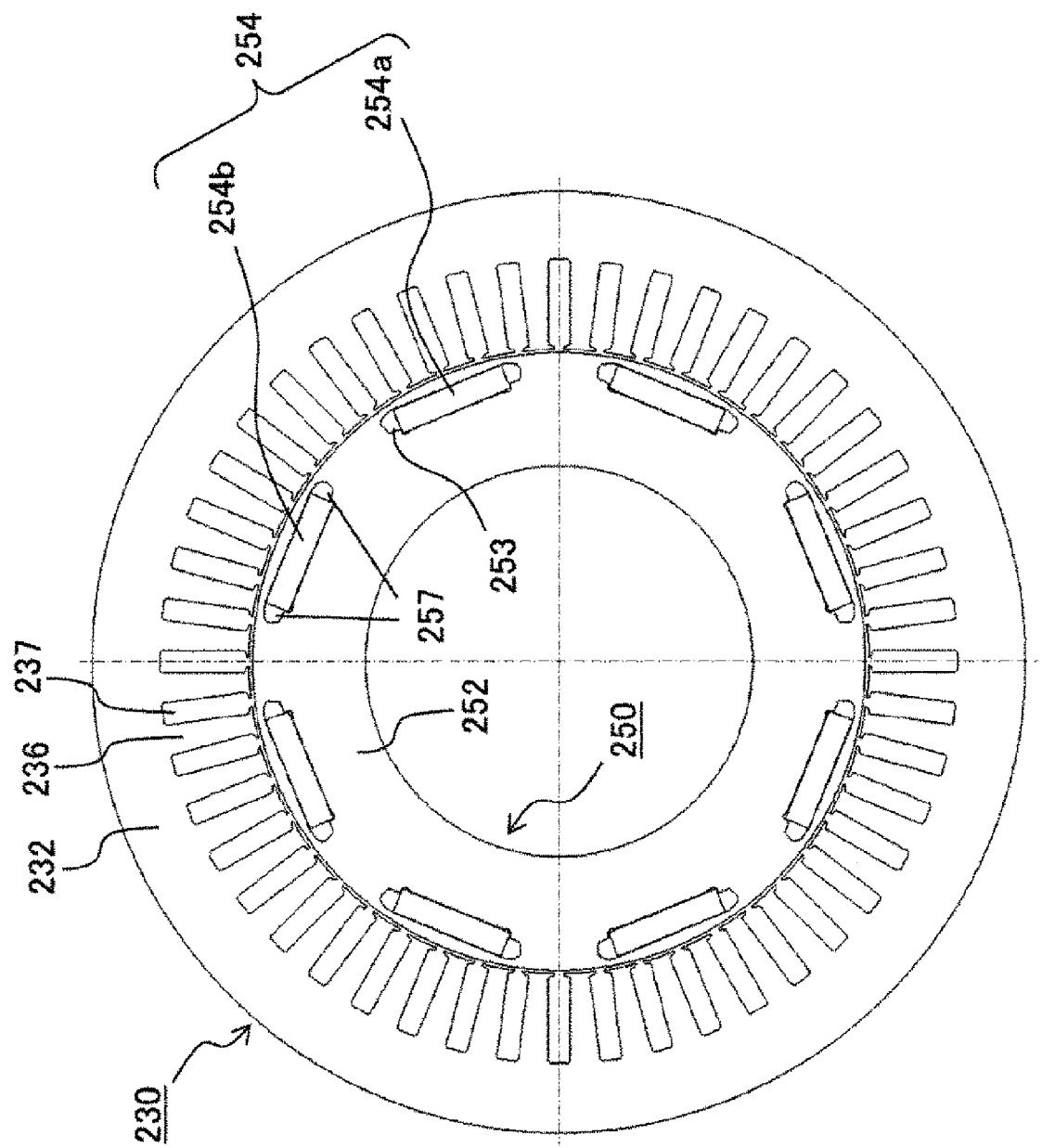
FIG. 4 is a view illustrating a cross section of a stator and a rotor.

FIG. 4 is a view illustrating a cross section of the stator 230 and the rotor 250 and illustrates a cross-sectional view taken along a line A-A of FIG. 3. Incidentally, FIG. 4 does not illustrate the housing 212, the shaft 218, and the stator winding 238. A large number of slots 237 and teeth 236 are equally arranged over the entire circumference on the inner circumference side of the stator core 232. In FIG. 4, not all the slots and teeth are attached with reference signs, and only some of the teeth and slots are attached with reference signs as representatives. A slot insulating material (not illustrated) is provided inside the slot 237, and a plurality of phase windings of U-phase, V-phase, and W-phase constituting the stator winding 238 of FIG. 3 are mounted inside the slot 237. In the present embodiment, 48 slots 237 are formed at regular intervals.

In addition, a plurality of (eight) holes 253 to allow rectangular magnets to be inserted therein are arranged in the vicinity of the outer circumference of the rotor core 252 at regular intervals along a circumferential direction. The respective holes 253 are formed along the axial direction, and the permanent magnets 254 (254a and 254b) are buried in the holes 253, respectively, and are fixed using an adhesive or the like. Widths of the holes 253 in the circumferential direction are set to be larger than widths of the permanent magnets 254 in the circumferential direction, and hole spaces 257 on both sides of the permanent magnet 254 function as magnetic voids. The hole space 257 may be filled with an adhesive or may be integrally fixed with the permanent magnet 254 using molding resin. The permanent magnet 254 acts as a field pole of the rotor 250, and has an eight-pole configuration in the present embodiment.

A magnetization direction of the permanent magnet 254 is oriented in a radial direction, and the orientation of the magnetization direction is reversed for each field pole. That is, when assuming that a surface of the permanent magnet 254a on the stator side is an N pole and a surface of the permanent magnet 254a on the axis side is an S pole, a surface of the adjacent permanent magnet 254b on the stator side is an S pole and a surface of the permanent magnet 254b on the axis side is an N pole. Further, these permanent magnets 254a and 254b are alternately arranged in the circumferential direction.

The permanent magnet 254 may be inserted through the hole 253 after being magnetized or may be magnetized by applying a strong magnetic field after being inserted through the hole 253 of the rotor core 252. However, since the magnetized permanent magnet 254 is a strong magnet, a strong attractive force is generated between the rotor core 252 and the permanent magnet 254 at the time of fixing the permanent magnet 254 to hinder assembling work if the magnet is magnetized before fixing the permanent magnet 254 to the rotor 250. In addition, there is a risk that dust such as iron powder may adhere to the permanent magnet 254 due to the strong attractive force of the permanent magnet 254. Thus, magnetization is preferably performed after inserting the permanent magnet 254 into the rotor core 252 in consideration of the productivity of the rotating electrical machine.

Incidentally, a sintered magnet containing neodymium or samarium, a ferrite magnet, a bond magnet containing neodymium, or the like can be used as the permanent magnet 254. The permanent magnet 254 has a residual magnetic flux density of approximately 0.4 to 1.4 T.

When a rotating magnetic field is generated in the stator 230 as the three-phase alternating current flows to the stator winding 238, this rotating magnetic field acts on the permanent magnets 254a and 254b of the rotor 250 to generate a torque. This torque is expressed by a product of a component, which interlinks with each phase winding, of a magnetic flux emitted from the permanent magnet 254 and a component, which is perpendicular to the interlinking magnetic flux, of the alternating current flowing through each phase winding. Here, since the alternating current is controlled so as to have a sine waveform, a product of a fundamental wave component of the interlinking magnetic flux and a fundamental wave component of the corresponding alternating current represents a time-averaged component of the torque and a product of a harmonic component of the interlinking magnetic flux and a fundamental wave component of the alternating current represents a torque ripple which is a harmonic component of the torque. That is, the harmonic component of the interlinking magnetic flux may be reduced in order to reduce the torque ripple. In other words, since a product of the interlinking magnetic flux and angular velocity of the rotor is an induced voltage, reduction of the harmonic component of the interlinking magnetic flux is equivalent to reduction of the harmonic component of the induced voltage.

Figure 5:
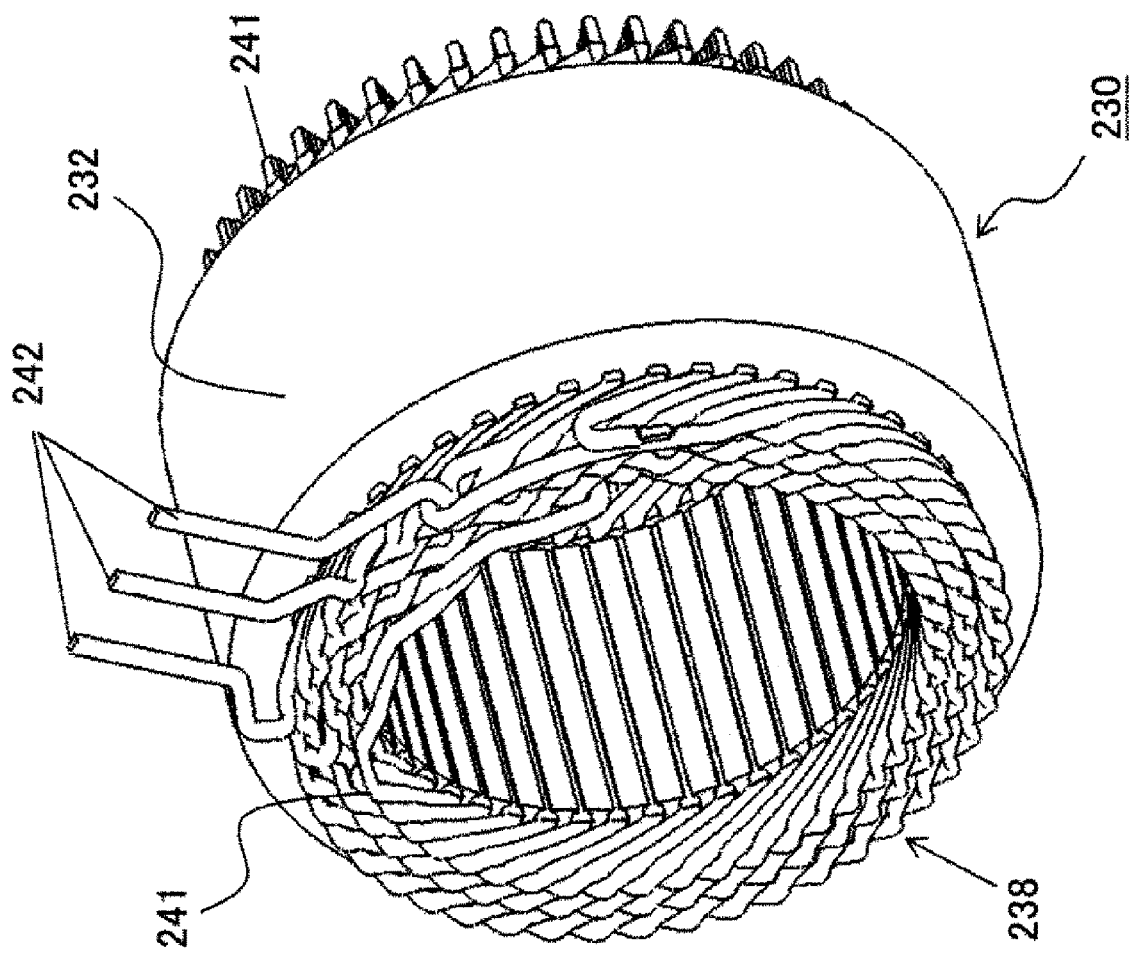
FIG. 5 is a perspective view of the stator.

FIG. 5 is a perspective view of the stator 230. In the present embodiment, the stator winding 238 is wound around the stator core 232 in a wave winding. Coil ends 241 of the stator winding 238 are formed at the two end surfaces of the stator core 232. In addition, lead wires 242 of the stator winding 238 are led out on one end surface side of the stator core 232. The lead wires 242 are led out in correspondence to the U-phase, the V-phase, and the W-phase.

Figure 6:
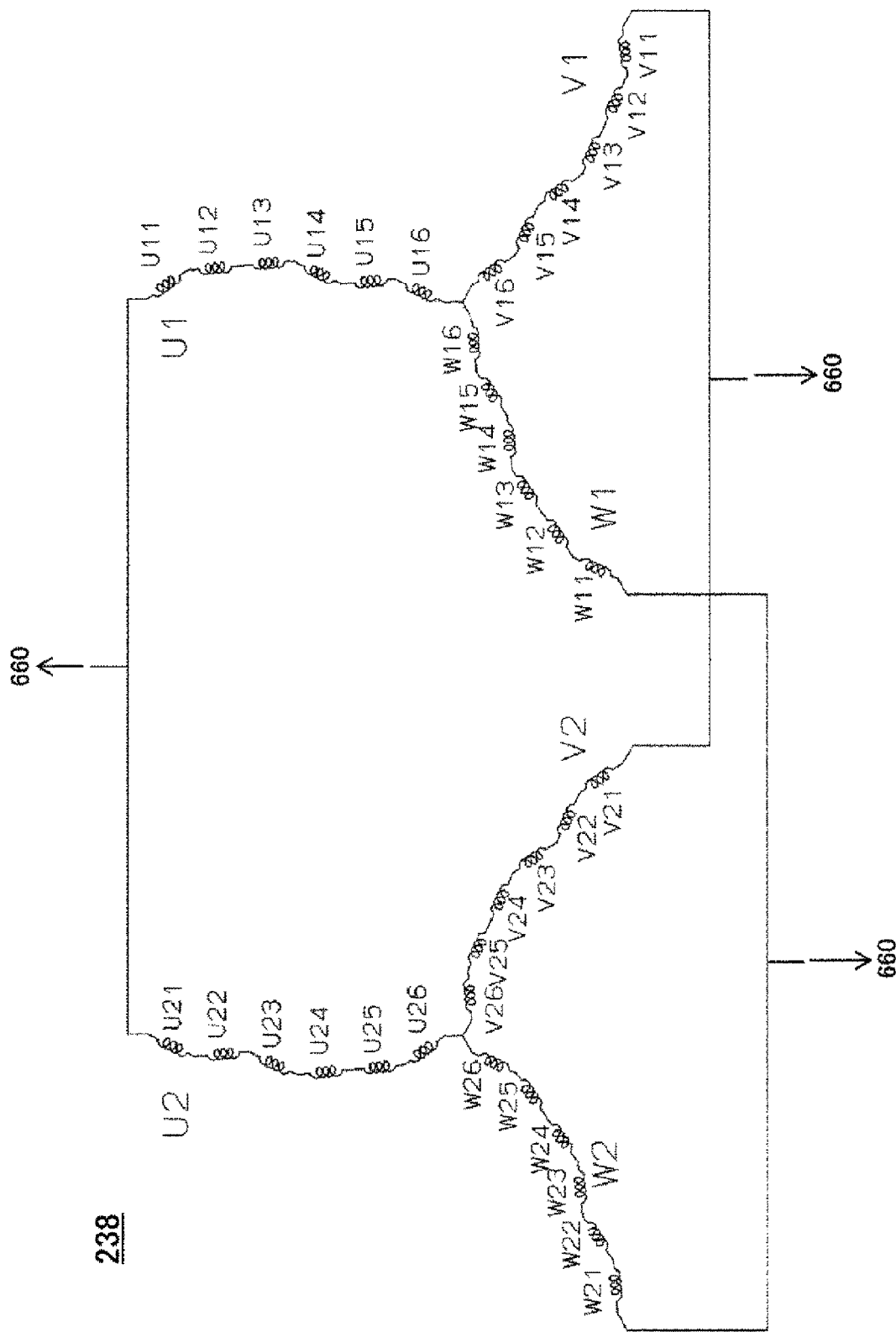
FIG. 6 is a connection diagram of a stator winding.

FIG. 6 is a connection diagram of the stator winding 238 and illustrates a connection method and an electrical phase relation among the respective phase windings. A double star connection is adopted for the stator winding 238 of the present embodiment, and a first star connection formed of a U1-phase winding group, a V1-phase winding group, and a W1-phase winding group is connected in parallel with a second star connection formed of a U2-phase winding group, a V2-phase winding group, and a W2-phase winding group. Each of the U1-phase winding group, the V1-phase winding group, and the W1-phase winding group and the U2-phase winding group, the V2-phase winding group, and the W2-phase winding group is constituted by six round windings. The U1-phase winding group has round windings U11 to U16, the V1-phase winding group has round windings V11 to V16, the W1-phase winding group has round windings W11 to W16, the U2-phase winding group has round windings U21 to U26, the V2-phase winding group has round windings V21 to V26, and the W2-phase winding group has round windings W21 to W26. As illustrated in FIG. 6, the U-phases are electrically connected to each other, the V-phases are electrically connected to each other, and the W-phases are electrically connected to each other in the first star connection and the second star connection, and such connection portions thereof are connected to the current sensor 660.

As illustrated in FIG. 6, the V-phase and the W-phase have substantially the same configuration as the U-phase, and are disposed such that phases of voltages induced at the respective phases are shifted by 120 degrees in electrical angle. In addition, angles formed by the respective round windings represent relative phases. The stator winding 238 adopts the double star (2Y) connection wired in parallel in the present embodiment as illustrated in FIG. 6, but may adopt a single star (1Y) connection with two star connections connected in series depending on a drive voltage of the rotating electrical machine.

Figure 7:
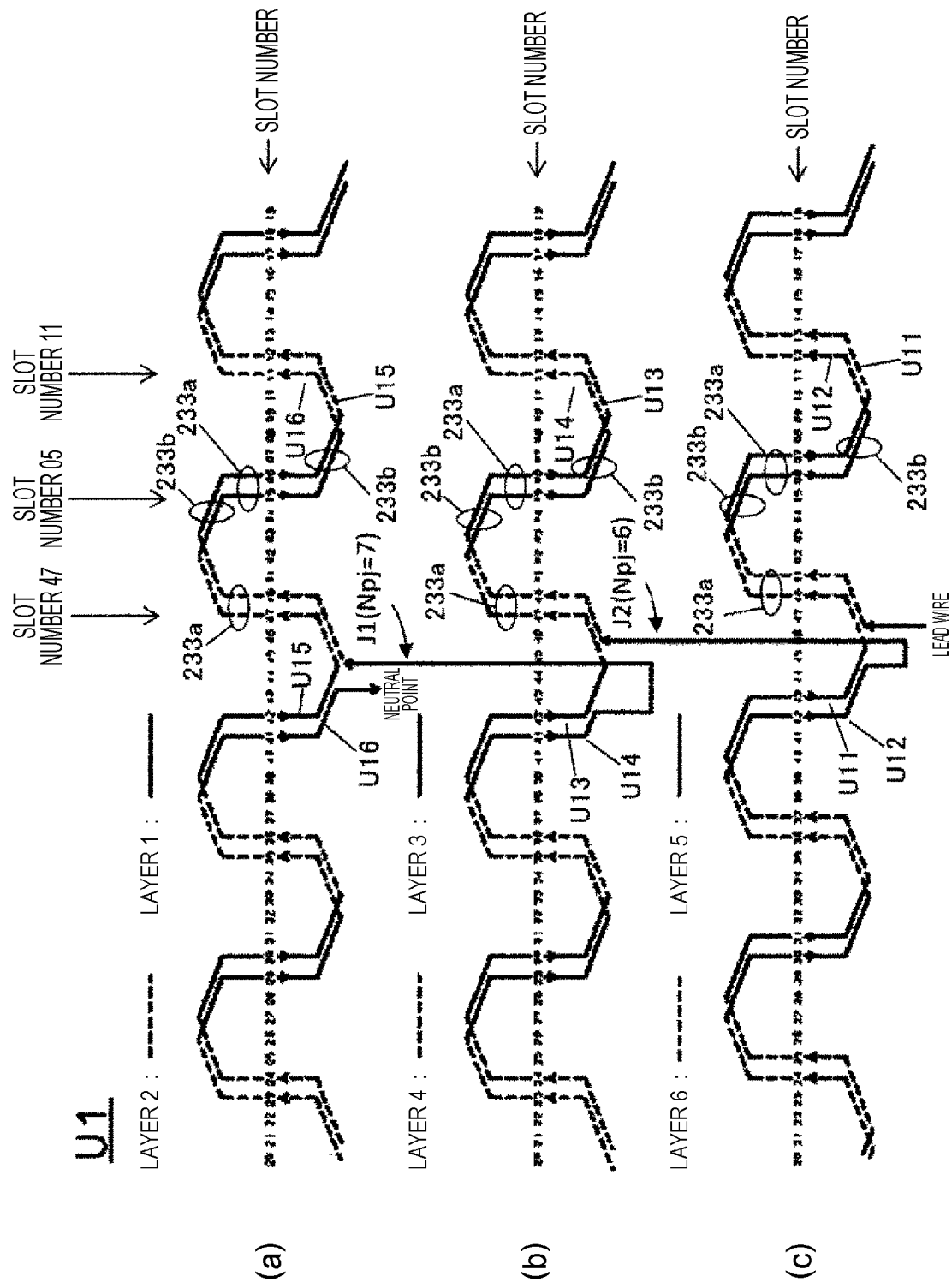
FIG. 7 is a diagram illustrating a U1-phase winding.
Figure 8:
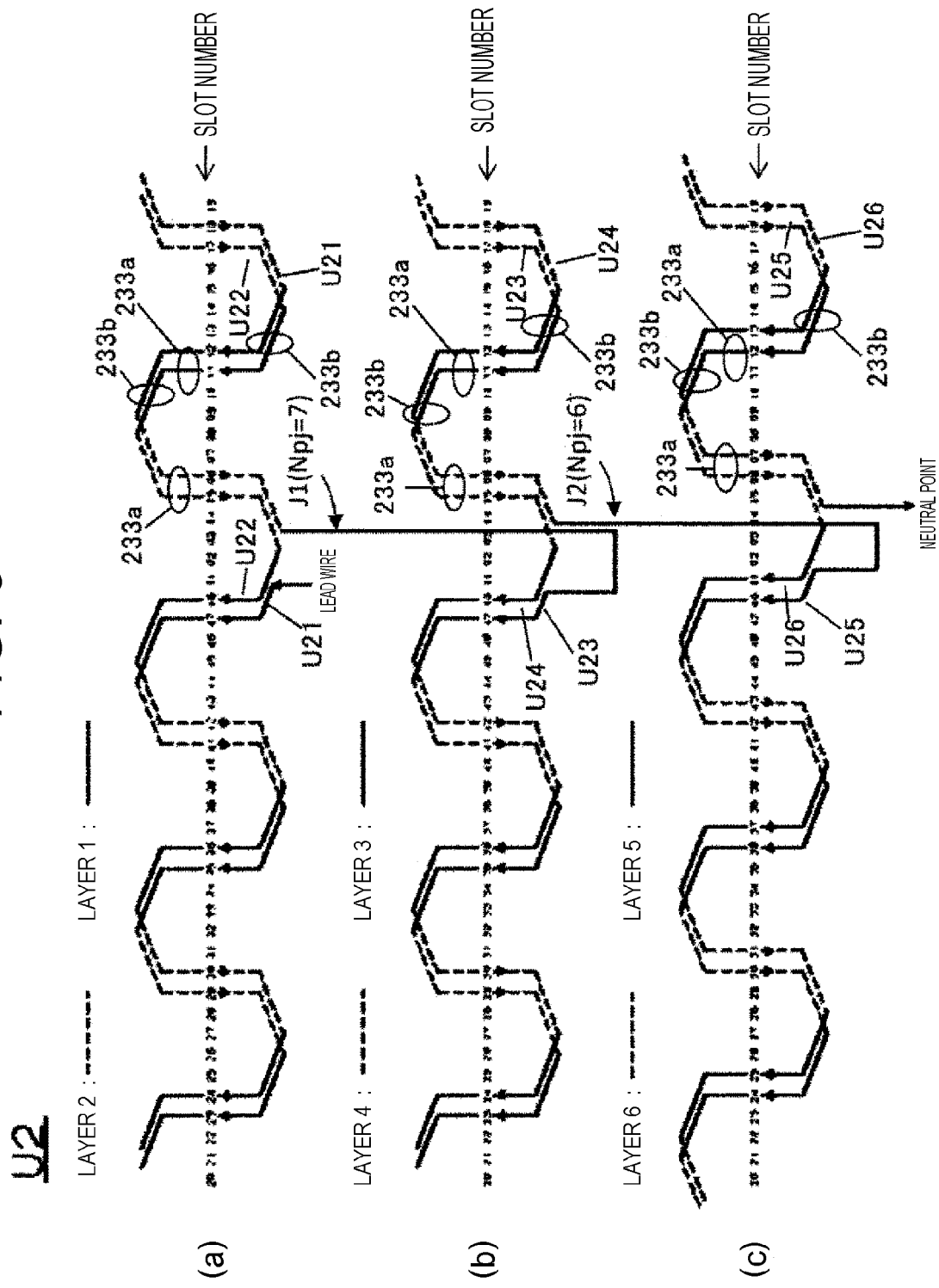
FIG. 8 is a diagram illustrating a U2-phase winding.

FIGS. 7 and 8 are diagrams illustrating detailed connections of the U-phase winding of the stator winding 238. As described above, the 48 slots 237 are formed in the stator core 232 (see FIG. 4), and reference signs 01, 02 to 47, and 48 illustrated in FIGS. 7 and 8 indicate slot numbers.

FIG. 7(a) illustrates the round windings U15 and U16 of the U1-phase winding group. FIG. 7(b) illustrates the round windings U13 and U14 of the U1-phase winding group. FIG. 7(c) illustrates the round windings U11 and U12 of the U1-phase winding group.

FIG. 8(a) illustrates the round windings U21 and U22 of the U2-phase winding group. FIG. 8(b) illustrates the round windings U23 and U24 of the U2-phase winding group. FIG. 8(c) illustrates the round windings U25 and U26 of the U2-phase winding group.

As illustrated in FIGS. 7 and 8, each of the round windings U11 to U26 is made up of a slot conductor 233a inserted through the slot and a cross conductor 233b that connects ends of the slot conductors 233a on the same side, which have been inserted through the different slots, to constitute the coil end 241 (see FIG. 5). For example, in the case of the slot conductor 233a inserted through the slot 237 of the slot number 05 illustrated in FIG. 7(a), an end of the slot conductor 233a on the upper side of the drawing is connected to an upper end of the slot conductor 233a inserted through the slot 237 of the slot number 47 via the cross conductor 233b constituting an upper coil end. On the other hand, a lower end of the slot conductor 233a is connected to a lower end of the slot conductor 233a inserted through the slot 237 of the slot number 11 via the cross conductor 233b constituting a lower coil end. As the slot conductors 233a are connected to each other via the cross conductor 233b in such a form, the round winding as a wave winding that makes substantially one turn around the stator core 232 is formed.

As will be described later, the six slot conductors 233a are inserted through the single slot side by side from the inner circumference side to the outer circumference side in the present embodiment, and will be referred to as a layer 1, a layer 2, a layer 3, a layer 4, layer 5, and a layer 6 sequentially from the inner circumference side. In FIGS. 7 and 8, portions indicated by solid lines of the round windings U15, U16, U21 and U22 represent the layer 1, and portions indicated by broken lines represent the layer 2. In the round windings U13, U14, U23, and U24, portions indicated by solid lines represent the layer 3, and portions indicated by broken lines represent the layer 4. In the round windings U11, U12, U25 and U26, portions indicated by solid lines represent the layer 5, and portions indicated by broken lines represent the layer 6.

Incidentally, the round windings U11 to U26 may be made up of continuous conductors or segment coils may be connected to each other by welding or the like after inserting the segment coils through the slots. In the case of using the segment coils, the coil ends 241 positioned at both axial ends of ends of the stator cores 232 can be molded in advance before inserting the segment coils through the slots 237, and an appropriate insulating distance can be easily provided between difference phases or the same phases. As a result, it is possible to suppress partial discharge caused by a surge voltage generated by the switching operation of the IGBT 21, which is effective for insulation.

In addition, the conductor used for the round winding may be a conductor having a large number of flat rectangular wires, round wires, or thin wires, and the flat rectangular wire is suitable in order to increase a space factor for the purpose of miniaturization with a high output and high efficiency.

Figure 9:
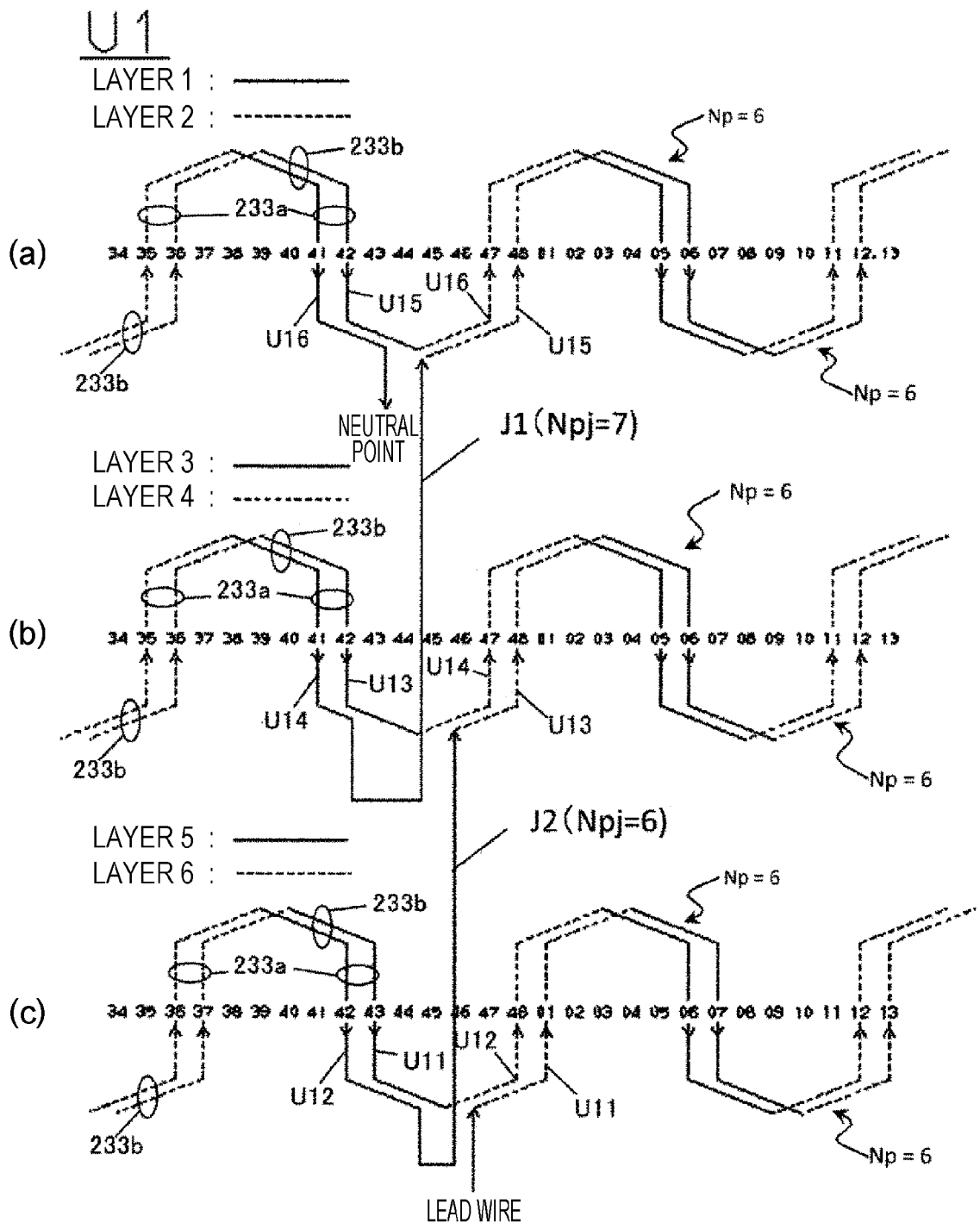
FIG. 9 is an enlarged diagram of a part of a U1-phase winding group.
Figure 10:
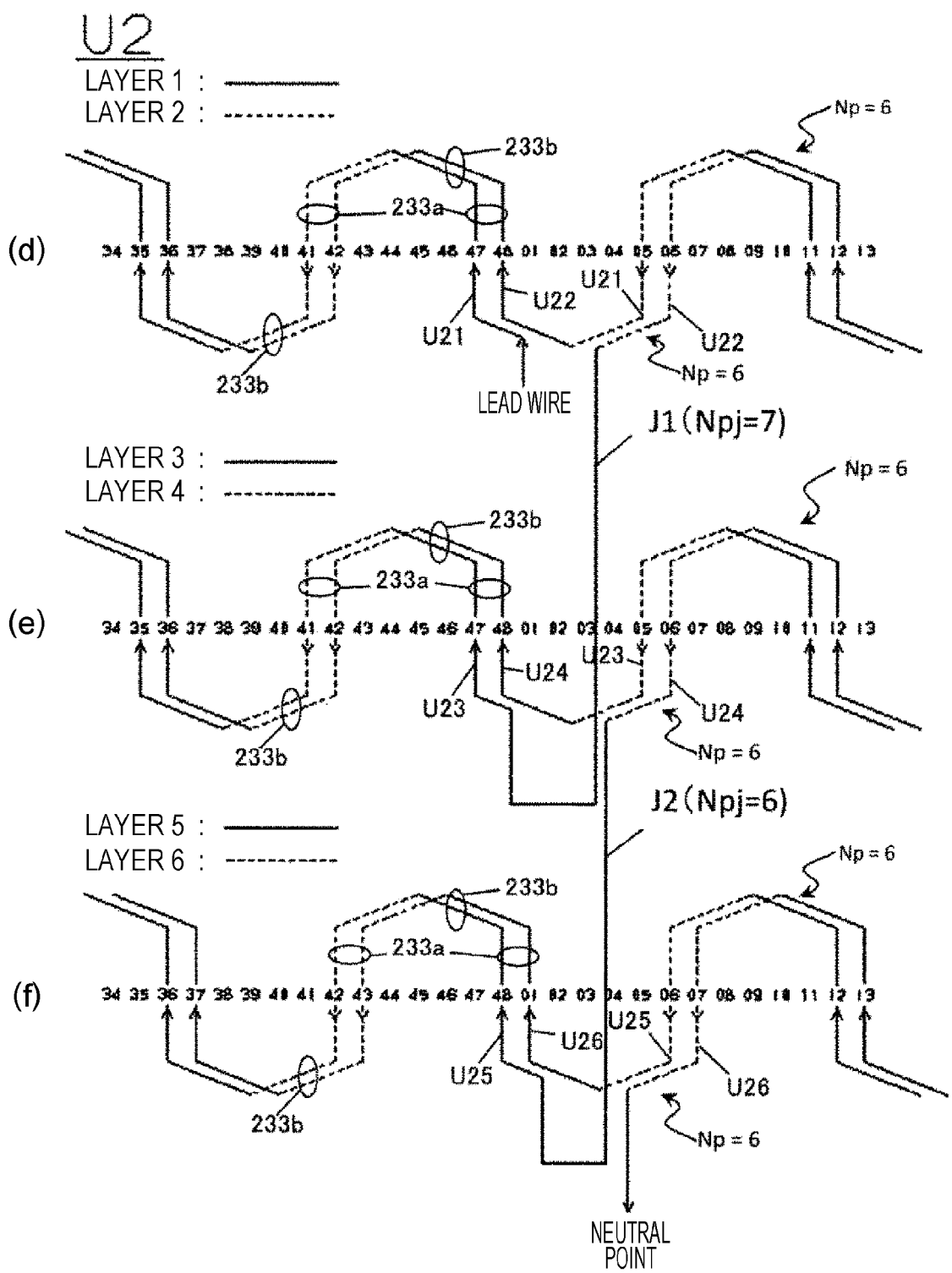
FIG. 10 is an enlarged diagram of a part of a U2-phase winding group.

FIG. 9 is an enlarged diagram illustrating a part of the U1-phase winding group illustrated in FIG. 7. FIG. 10 is an enlarged diagram of a part of the U2-phase winding group illustrated in FIG. 8. FIGS. 9 and 10 illustrate about four poles including a portion corresponding to a jumper wire. Hereinafter, a winding method of the U1-phase winding group will be described with reference to FIG. 9, and a winding method of the U2-phase winding group will be described with reference to FIG. 10.

As illustrated in FIG. 9(c), the round winding U11 of the stator winding group U1 enters the layer 6 of the slot number 01 starting at the lead wire, extends astride six slots (that is, six slot pitches) via the cross conductor 233b, and then, the slot conductor 233a enters the layer 5 of the slot number 07. Next, the stator winding group U1 extends astride six slots from the layer 5 of the slot number 07 and enters the layer 6 of the slot number 13.

In this manner, the stator winding is wound in a wave winding so as to make one turn around the stator core 232 up to the layer 5 of the slot number 43 such that the straddling amount of the cross conductor 233b on the coil end side (the lower side in the drawing) where the lead wire is led out is a slot pitch Np=6, and the straddling amount of the cross conductor 233b on the coil end side on the opposite side (the upper side in the drawing) is also the slot pitch Np=6. This stator winding corresponding to the substantially one turn corresponds to the round winding U11 illustrated in FIG. 6.

Next, the stator winding coming out of the layer 5 of the slot number 43 straddles five slots and enters the layer 6 of the slot number 48. The stator winding from the layer 6 of the slot number 48 corresponds to the round windings U12 illustrated in FIG. 6. Even in the round winding U12, the straddling amount of the cross conductor 233b is set to the slot pitch Np=6 on both the side where the lead wire is present and the opposite side, and the stator winding is wound in a wave winding so as to make one turn around the stator core 232 up to the layer 5 of the slot number 42. This stator winding corresponding to the substantially one turn corresponds to the round winding U12.

Incidentally, since the round winding U12 is wound to be shifted with respect to the round winding U11 by one slot pitch, a phase difference corresponding to an electrical angle equivalent to one slot pitch is generated. In the present embodiment, one slot pitch corresponds to an electrical angle of 30 degrees, and the round winding U11 and the round winding U12 are illustrated to be shifted from each other by 30 degrees even in FIG. 6.

Further, as illustrated in FIGS. 9(b) and 9(c), the stator winding coming out of the layer 5 of the slot number 42 enters the layer 4 of the slot number 48 via a jumper wire J2 having a straddling amount Npj of six slot pitches. The stator winding from the layer 4 of the slot number 48 corresponds to the round windings U13 illustrated in FIG. 6. Even in the round winding U13, the straddling amount of the cross conductor 233b is set to the slot pitch Np=6 on both the side where the lead wire is present and the opposite side, and the stator winding is wound in a wave winding so as to make one turn around the stator core 232 up to the layer 3 of the slot number 42. This stator winding corresponding to the substantially one turn corresponds to the round winding U13.

Next, the stator winding coming out of the layer 3 of the slot number 42 straddles five slots and enters the layer 4 of the slot number 47. The stator winding from the layer 4 of the slot number 47 corresponds to the round windings U14 illustrated in FIG. 6. Even in the round winding U14, the straddling amount of the cross conductor 233b is set to the slot pitch Np=6 on both the side where the lead wire is present and the opposite side, and the stator winding is wound in a wave winding so as to make one turn around the stator core 232 up to the layer 3 of the slot number 41. This stator winding corresponding to the substantially one turn corresponds to the round winding U14.

Incidentally, since the round winding U14 is wound to be shifted with respect to the round winding U13 by one slot pitch, a phase difference corresponding to an electrical angle equivalent to one slot pitch is generated. In the present embodiment, one slot pitch corresponds to an electrical angle of 30 degrees, and the round winding U13 and the round winding U14 are illustrated to be shifted from each other by 30 degrees even in FIG. 6.

Further, as illustrated in FIGS. 9(a) and 9(b), the stator winding coming out of the layer 3 of the slot number 41 enters the layer 2 of the slot number 48 via a jumper wire J1 having a straddling amount Npj of seven slot pitches. The stator winding from the layer 2 of the slot number 48 corresponds to the round windings U15 illustrated in FIG. 6. Even in the round winding U15, the straddling amount of the cross conductor 233b is set to the slot pitch Np=6 on both the side where the lead wire is present and the opposite side, and the stator winding is wound in a wave winding so as to make one turn around the stator core 232 up to the layer 1 of the slot number 42. This stator winding corresponding to the substantially one turn corresponds to the round winding U15.

Next, the stator winding coming out of the layer 1 of the slot number 42 straddles five slots and enters the layer 2 of the slot number 47. The stator winding from the layer 2 of the slot number 47 corresponds to the round windings U16 illustrated in FIG. 6. Even in the round winding U16, the straddling amount of the cross conductor 233b is set to the slot pitch Np=6 on both the side where the lead wire is present and the opposite side, and the stator winding is wound in a wave winding so as to make one turn around the stator core 232 up to the layer 1 of the slot number 41. This stator winding corresponding to the substantially one turn corresponds to the round winding U16.

Incidentally, since the round winding U16 is wound to be shifted with respect to the round winding U15 by one slot pitch, a phase difference corresponding to an electrical angle equivalent to one slot pitch is generated. In the present embodiment, one slot pitch corresponds to an electrical angle of 30 degrees, and the round winding U15 and the round winding U16 are illustrated to be shifted from each other by 30 degrees even in FIG. 6.

As described above, the round winding U12 and the round winding U13 are connected via the jumper wire J2 having the straddling amount Npj of six slot pitches. Thus, the round winding U13 is wound to be shifted with respect to the round winding U11 by one slot pitch so that a phase difference corresponding to an electrical angle equivalent to one slot pitch is generated. In the present embodiment, one slot pitch corresponds to an electrical angle of 30 degrees, and the round winding U11 and the round winding U13 are illustrated to be shifted from each other by 30 degrees even in FIG. 6. Similarly, the round winding U14 is wound to be shifted with respect to the round winding U12 by one slot pitch.

In addition, the round winding U14 and the round winding U15 are connected via the jumper wire J1 having the straddling amount Npj of seven slot pitches. Thus, the round winding U15 is wound in the same slot as that of the round winding U13 so that no phase difference is generated. Even in FIG. 6, the round winding U13 and the round winding U15 are illustrated so as not to be shifted in angle. Similarly, the round winding U16 is wound in the same slot as the round winding U14.

Incidentally, the straddling amount of the cross conductor 233b is set to the slot pitch Np=6 on both the side where the lead wire is present and the opposite side in the round windings U11, U12, U13, U14, U15, and U16 in the present embodiment. However, the round winding may be wound in a wave winding with irregular slot pitches such that the straddling amount of the cross conductor 233b on the coil end side (the lower side in the drawing) from which the lead wire is led out is the slot pitch Np=7, and the straddling amount of the cross conductor 233b on the coil end side on the opposite side (the upper side in the drawing) is the slot pitch Np=5.

The stator winding group U2 illustrated in FIG. 10 is also wound with the same straddling amount as that of each layer of the stator winding group U1. The round winding U21 is wound from the layer 1 of the slot number 47 to the layer 2 of the slot number 05. Thereafter, the round winding straddles five slots to enter the layer 1 of the slot number 48, and the round winding U22 is wound from the layer 1 of the slot number 48 to the layer 2 of the slot number 06.

Thereafter, the stator winding enters the layer 3 of the slot number 47 from the layer 2 of the slot number 06 via the jumper wire J1 having the straddling amount Npj of seven slot pitches, and wound up to the layer 4 of the slot number 05 as the round winding U23. Thereafter, the round winding straddles five slots to enter the layer 3 of the slot number 48, and the round winding U24 is wound from the layer 3 of the slot number 48 to the layer 4 of the slot number 06.

Next, the stator winding enters the layer 5 of the slot number 48 from the layer 4 of the slot number 06 via the jumper wire J2 having the straddling amount Npj of six slot pitches, and wound up to the layer 6 of the slot number 06 as the round winding U25. Thereafter, the round winding U26 is wound from the layer 5 of the slot number 01 to the layer 6 of the slot number 07.

As described above, the stator winding group U1 is made up of the round windings U11, U12, U13, U14, U15, and U16, and a voltage obtained by combining voltages generated at the respective phases is induced at the stator winding group U1. Similarly, a voltage obtained by combining voltages generated at the phases of the round windings U21, U22, U23, U24, U25, and U26 is induced in the case of the stator winding group U2.

As illustrated in FIG. 6, the stator winding group U1 and the stator winding group U2 are connected in parallel, but there is no phase difference between the voltages induced in the stator winding groups U1 and U2, respectively, and there is no imbalance such as flow of a circulating current even through the stator winding groups U1 and U2 are connected in parallel. Of course, the stator winding groups U1 and U2 may be connected in series.

Figure 11:
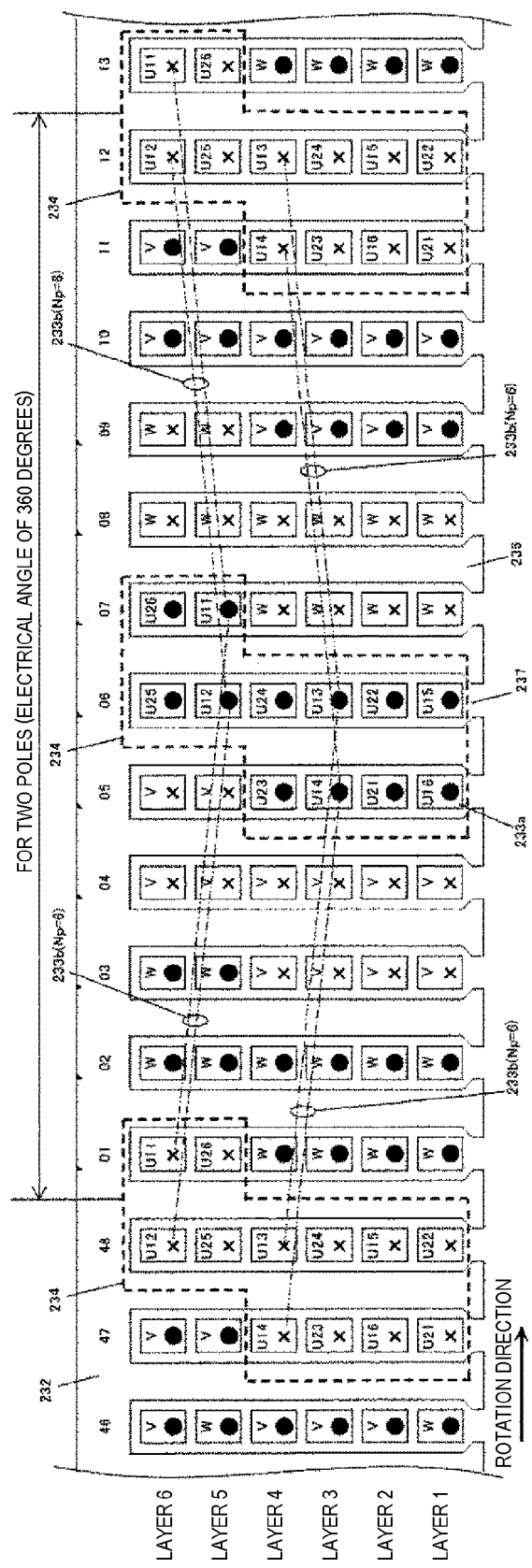
FIG. 11 is a diagram illustrating arrangement of slot conductors.

FIG. 11 is a view mainly illustrating arrangement of the slot conductors 233a in the stator core 232 and illustrates the slot number 46 to the slot number 13 in FIGS. 7 to 10. Incidentally, a rotation direction of the rotor is a direction from the left to the right in the drawing.

In the present embodiment, twelve slots 237 are arranged at two poles, that is, at an electrical angle of 360 degrees, and for example, the slot number 01 to the slot number 12 in FIG. 11 correspond to the two poles. Thus, the number N of slots per pole is six, and the number NSPP of slots per phase per pole is two (=6/3). The six slot conductors 233a of the stator windings 238 are inserted through each of the slots 237.

Each of the slot conductors 233a is illustrated as a rectangle. Reference signs U11 to U26, V, and W indicating the U-phase, the V-phase, and the W-phase and each of a cross mark "x" indicating a direction from the side where the lead wire is present to the opposite side and a black circle "●" indicating a reverse direction thereof are illustrated inside the rectangles. In addition, the slot conductor 233a present at the innermost circumference side (slot opening side) of the slot 237 is referred to as the layer 1, and the slot conductors 233a sequentially from the outer circumference side (slot bottom side) are referred to as the layer 2, the layer 3, the layer 4, the layer 5, and the layer 6. In addition, reference signs 01 to 12 are slot numbers similar to those illustrated in FIGS. 7 to 10. Incidentally, only the slot conductors 233a of the U-phase are indicated by the reference signs U11 to U26 representing the round windings, and the slot conductors 233a of the V-phase and the W-phase are indicated by the reference signs V and W representing phases.

In FIG. 11, twelve slot conductors 233a surrounded by a broken line 234 correspond to a slot conductor group 234 that is all made up of the U-phase slot conductors 233a. A specific example will be illustrated. For example, the slot conductor group 234 illustrated at the center includes the slot conductors 233a of the round windings U25, U26, U12, and U11 arranged in the layer 6 to the layer 5 of the slot numbers 06 and 07, and the slot conductors 233a of the round windings U23, U24, U14, U13, U21, U22, U16, and U15 arranged in the layer 4 to the layer 1 of the slot numbers 05 and 06.

Figure 12:
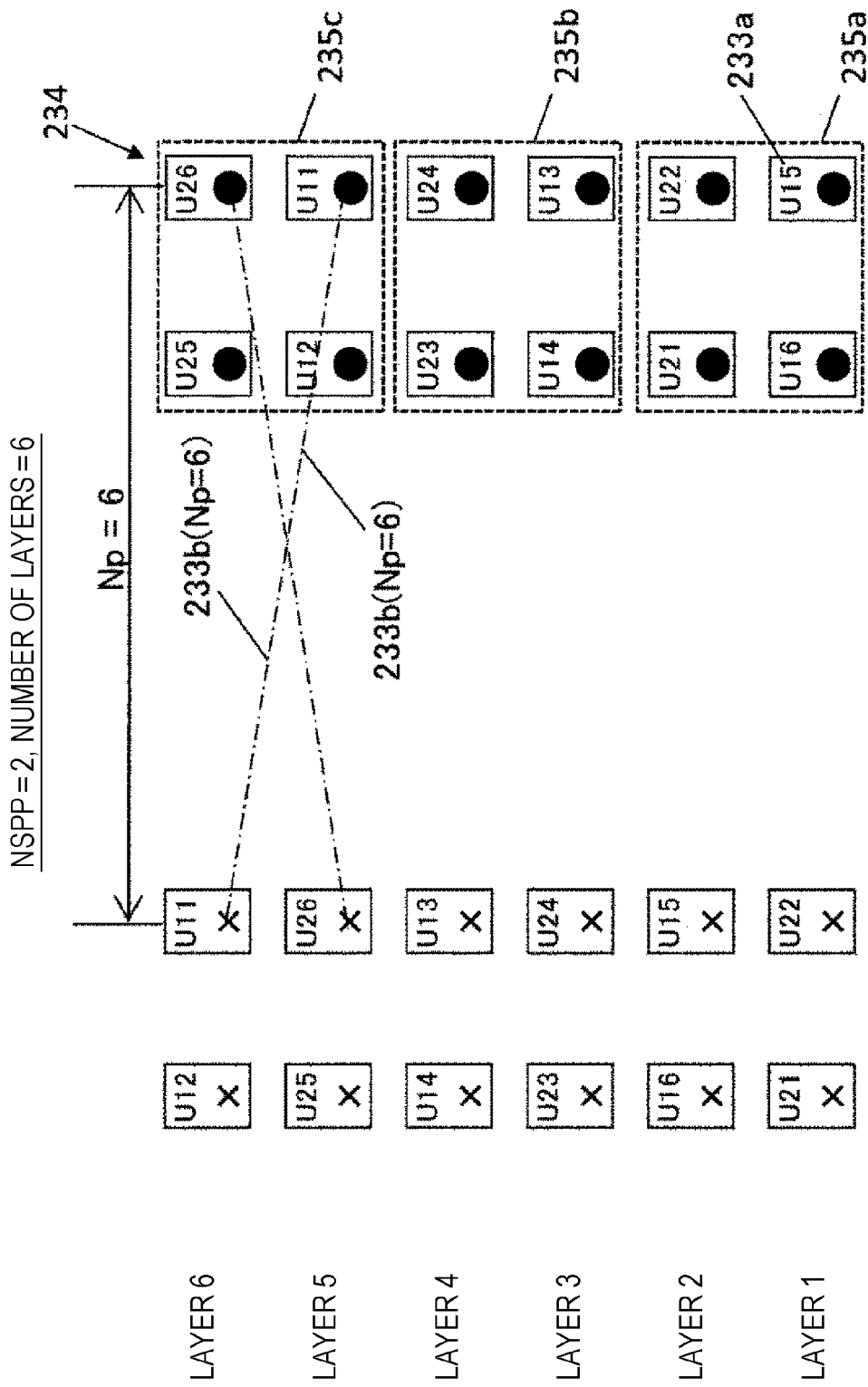
FIG. 12 is a diagram illustrating slot conductor arrangement of Comparative Example 1.

In general, when the number N of slots per pole is six, the number NSPP of slots per phase per pole is two, and the number of layers of the slot conductors 233a inside the slot 237 is six, the configuration in which the slot conductors 233a of the U-phase are arranged (the same description is applied for the V-phase and the W-phase) as illustrated in FIG. 12 is adopted in many cases. In this case, the straddling amount Npj of the jumper wire connecting the slot conductor 233a of the layer 2 and the slot conductor 233a of the layer 3 is seven slot pitches, and the straddling amount Npj of the jumper wire connecting the slot conductor 233a of the layer 4 and the slot conductor 233a of the layer 5 is also seven slot pitches. As a result, the round windings of the same phase are arranged without being shifted in the circumferential direction of the stator core 232.

Figure 13:
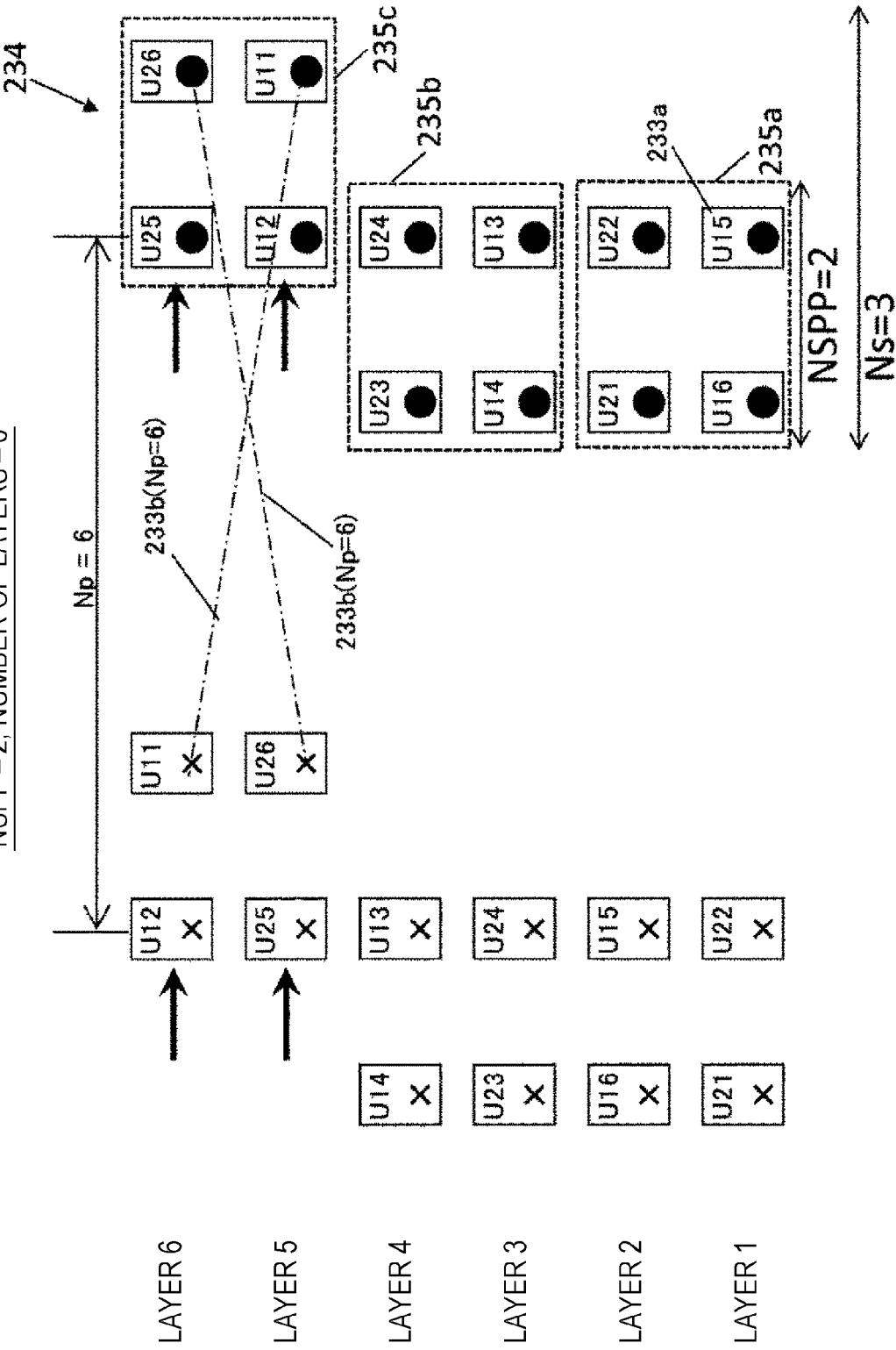
FIG. 13 is a diagram for describing arrangement of slot conductors according to an embodiment.

On the other hand, the configuration of the present embodiment is a configuration in which the four slot conductors 233a of each of the layer 5 and the layer 6 illustrated in FIG. 12 are shifted by one slot pitch in the rotation direction (the right direction in the drawing) of the rotor as illustrated in FIG. 13. At this time, the straddling amount Npj of the jumper wire J2 connecting the slot conductor 233a of the layer 4 and the slot conductor 233a of the layer 5 is six slot pitches, and the straddling amount Npj of the jumper wire J1 connecting the slot conductor 233a of the layer 2 and the slot conductor 233a of the layer 3 is seven slot pitches.

In this case, the respective slot conductors 233a corresponding to the V-phase and the W-phase as well as the U-phase are similarly shifted by one slot pitch, and thus, slot conductor groups 234 having the same shape are formed for the U-phase, the V-phase, and the W-phase, respectively, as illustrated in FIG. 11. That is, a slot conductor group made up of the slot conductors 233a of the U-phase with the cross marks, a slot conductor group made up of the slot conductors 233a of the W-phase with the black circles, a slot conductor group made up of the slot conductors 233a of the V-phase with the cross marks, a slot conductor group made up of the slot conductors 233a of the U-phase with the black circles, a slot conductor group made up of the slot conductors 233a of the W-phase with the cross marks, and a slot conductor group made up of the slot conductors 233a of the V-phase with the black marks are sequentially arranged with respect to the rotation direction of the rotor.

As described above, when the number of layers is defined as 2×NL and n is defined as a natural number between one and NL, the round windings are inserted through the layer 2n−1 and the layer 2n. In the present embodiment, NL=3 since the total number of layers is six as illustrated in FIG. 13. The round windings U15, U16, U21, and U22 are inserted through the layer 1 and the layer 2 in the case of n=1. Similarly, the round windings U13, U14, U23, and U24 are inserted through the layer 3 and the layer 4 in the case of n=2, and the round windings U11, U12, U25, and U26 are inserted through the layer 5 and the layer 6 in the case of n=NL=3.

A line connecting different round windings in the radial direction among the round windings inserted through the layers 2n−1 and 2n is the jumper wire. There are two jumper wires when the number of layers is six. When N is defined as the number of slots per pole, these jumper wires include a jumper wire having the straddling amount Npj of (N+1) slot pitches and a jumper wire having the straddling amount of {(N+1)±1} slot pitches. In the present embodiment, the number N of slots per pole is six as illustrated in FIG. 11, the jumper wire J1 with seven slot pitches corresponds to the jumper wire with (N+1) slot pitches, and the jumper wire J2 with six slot pitches corresponds to the jumper wire with {(N+1)−1} slot pitches.

The slot conductor group 234 of the present embodiment will be further described with reference to FIG. 13. The slot conductor group 234 can be divided into slot conductor subgroups 235 (235a, 235b, and 235c) indicated by broken lines in FIG. 13. The slot conductor subgroup 235 is constituted by the slot conductor 233a inserted through an inner-circumferential-side layer and the slot conductor 233a inserted through an outer-circumferential-side layer, the slot conductors 233a being adjacent to each other in the radial direction of the stator core 232 and connected to the cross conductor 233b. The jumper wire is provided between the inner-circumferential-side layer of the slot conductor subgroup 235 and the outer-circumferential-side layer of the slot conductor subgroup 235 adjacent in the radial direction. For example, the jumper wire is provided between the layer 5 of the slot conductor subgroup 235c and the layer 4 of the slot conductor subgroup 235b.

In FIG. 13, positions of the slot conductor subgroup 235a and the slot conductor subgroup 235b coincide with each other in the circumferential direction. In this case, the straddling amount Npj of the jumper wire J1 is seven slot pitches, that is, (N+1) slot pitches as illustrated in FIG. 9. On the other hand, the slot conductor subgroup 235c is shifted with respect to the adjacent slot conductor subgroup 235b by one slot pitch in the rotation direction (the right direction in the drawing), and thus, the inner-circumferential-side layer of the slot conductor subgroup 235c and the outer-circumferential-side layer of the slot conductor subgroup 235b, connected via the jumper wire J2, are shifted from each other by one slot pitch. Thus, the straddling amount Npj of the jumper wire J2 is six slot pitches, that is, {(N+1)−1} slot pitches, smaller by one slot pitch than that of the jumper wire J1, as is understood from FIG. 9.

When the slot conductor subgroup 235c is shifted with respect to the slot conductor subgroup 235b by one slot pitch in a direction opposite to the rotation direction (the left direction in the drawing), the straddling amount Npj of the jumper wire J2 is eight slot pitches, that is, {(N+1)+1} slot pitches larger by one slot pitch than that of the jumper wire J1.

As described above, the stator windings of each phase include the slot conductor group 234 constituted by the plurality of slot conductors 233a inserted in a predetermined number Ns of slots continuously arranged in the circumferential direction of the stator core, and the cross conductor 233b connecting the coil end sides of the plurality of slot conductors 233a. The plurality of slot conductors 233a included in the single slot conductor group 234 are arranged such that slots and layers through which the slot conductors 233a are inserted are adjacent to each other. When the number of slots per phase per pole is defined as NSPP and the number of jumper wires having the straddling amount Npj of {(N+1)±1} slot pitches per phase is defined as 2×NJ, the number of slots 237 (hereinafter referred to as a predetermined number Ns of slots) through which the slot conductors 233a of the single slot conductor group 234 are inserted is set to Ns=NSPP+NJ.

In the present embodiment, the single jumper wire J2 with {(N+1)−1} slot pitches is present in each of the U1-phase winding and the U2-phase winding as is understood from the U-phase windings illustrated in FIGS. 7 and 8, and thus, NJ is one (2×NJ=2). In addition, NSPP=2 and Ns=3 as illustrated in FIG. 13, it is understood that Ns is set to Ns=NSPP+NJ.

Here, an operational effect of the rotating electrical machine of the present embodiment illustrated in FIG. 11 and the like will be described in comparison with Comparative Example 1 illustrated in FIG. 12 and Comparative Example 2 illustrated in FIG. 20.

In Comparative Example 1 illustrated in FIG. 12, positions of slot conductor subgroups 235a to 235c are not shifted in the circumferential direction but coincide with each other. Thus, both a straddling amount Npj of a jumper wire connecting a slot conductor 233a of a layer 2 and a slot conductor 233a of a layer 3 and a straddling amount Npj of a jumper wire connecting a slot conductor 233a of a layer 4 and a slot conductor 233a of a layer 5 become (N+1) slot pitches. Since the number N of slots per pole is set to N=6, (N+1) is seven.

Figure 20:
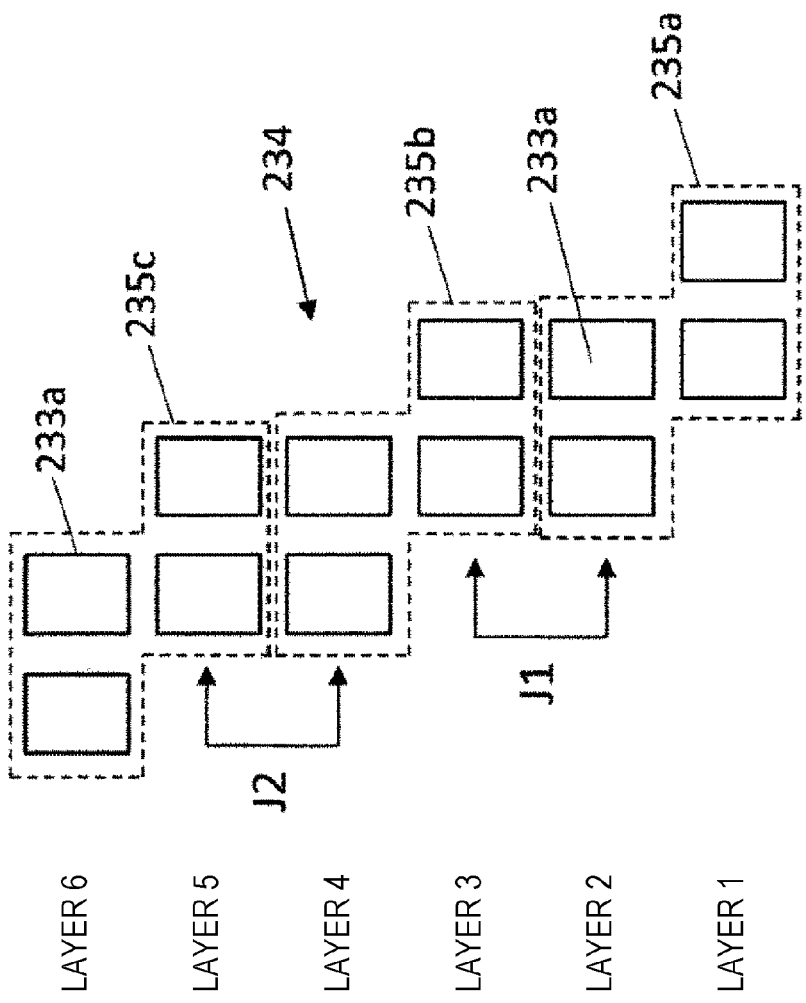
FIG. 20 is a diagram illustrating slot conductor arrangement of Comparative Example 2.

In Comparative Example 2 illustrated in FIG. 20, a slot conductor subgroup 235b is shifted with respect to a slot conductor subgroup 235a by one slot pitch to the left side in the drawing. Further, a slot conductor subgroup 235c is shifted with respect to the slot conductor subgroup 235b by one slot pitch to the left side in the drawing. However, a slot conductor 233a of a layer 2 and a slot conductor 233a of a layer 3 connected via a jumper wire J1 are inserted through the same slot, and positions thereof coincide with each other in the circumferential direction. Thus, a straddling amount Npj of the jumper wire J1 is (N+1). Even in the case of a jumper wire J2, since a slot conductor 233a of a layer 4 and a slot conductor 233a of a layer 5, connected via the jumper wire J1, are at the same position in the circumferential direction, a straddling amount Npj of the jumper wire J2 is (N+1).

Incidentally, an outer-circumferential-side layer is shifted with respect to an inner-circumferential-side layer by one slot pitch in the left direction of the drawing in the slot conductor subgroups 235a to 235c in the configuration illustrated in FIG. 20. Thus, a predetermined number Ns of slots is Ns=5.

Figure 14:
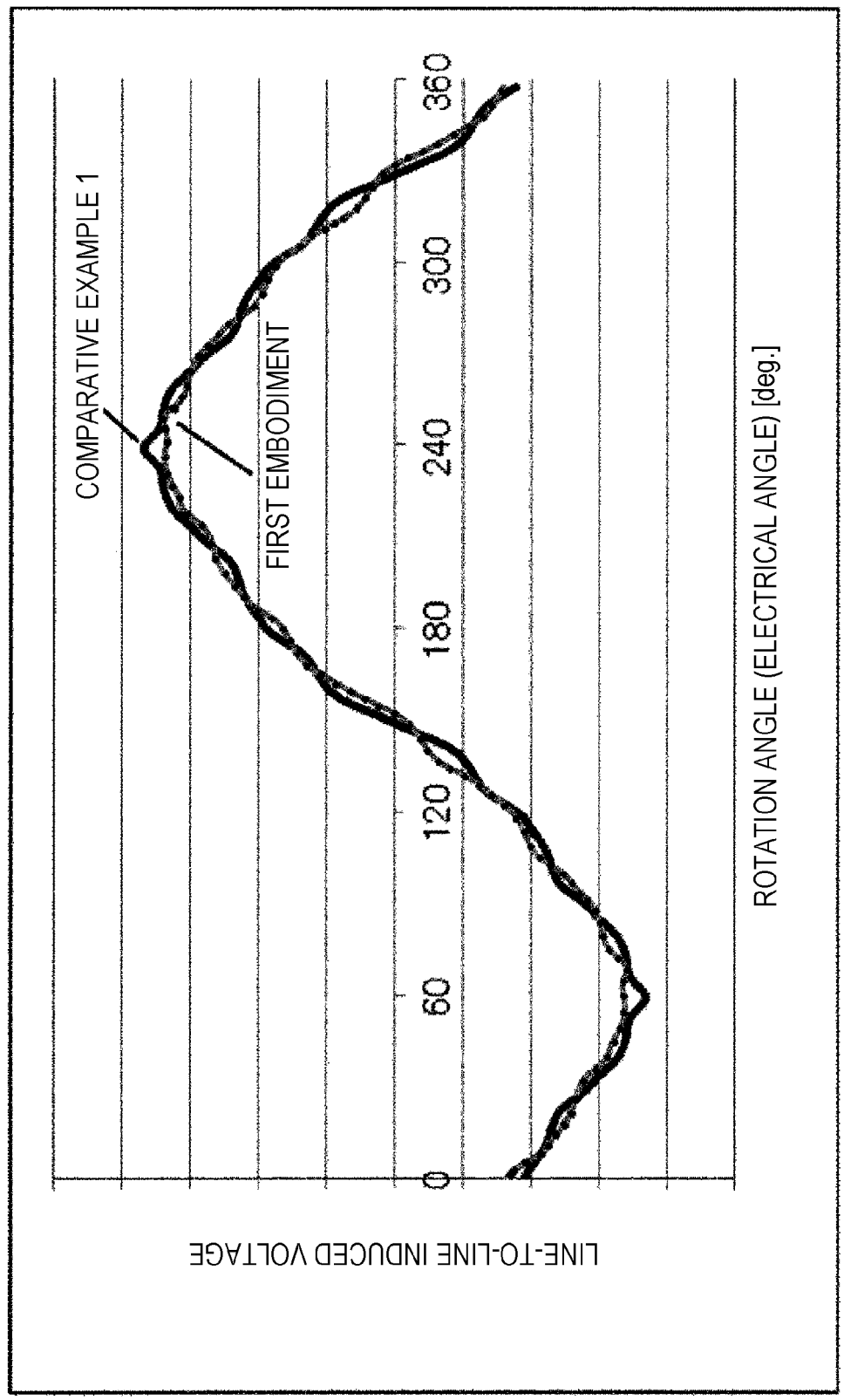
FIG. 14 is a graph illustrating an induced voltage waveform of the rotating electrical machine of the present embodiment and an induced voltage waveform of a rotating electrical machine of Comparative Example 1.
Figure 15:
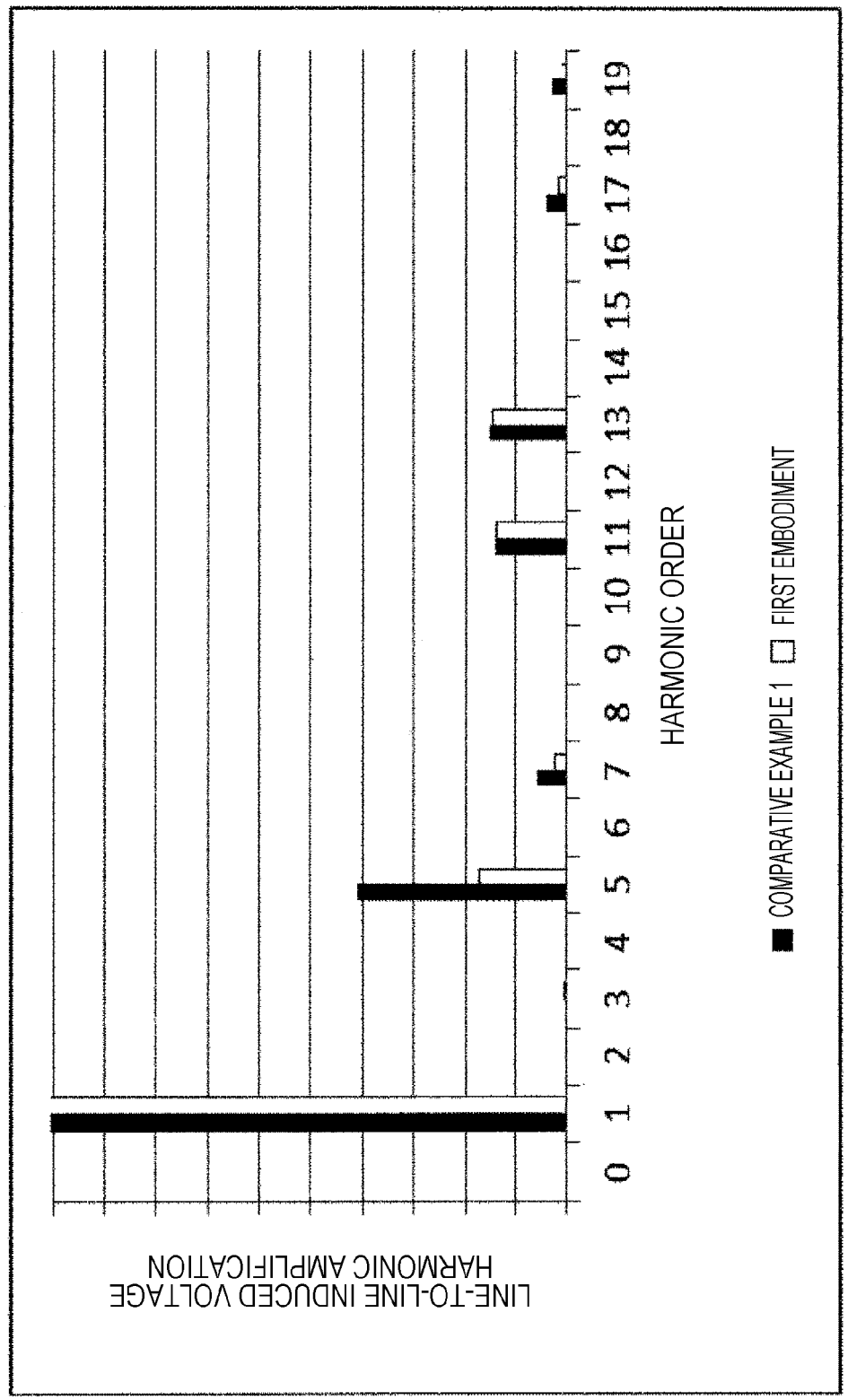
FIG. 15 is a graph illustrating a harmonic analysis result relating to the induced voltage waveforms in the embodiment and Comparative Example 1.

FIGS. 14 to 17 illustrate a case where the operational effect of the rotating electrical machine of the present embodiment is compared with the operational effect of Comparative Example 1. FIG. 14 is a graph illustrating an induced voltage waveform of the rotating electrical machine of the present embodiment and an induced voltage waveform of a rotating electrical machine of Comparative Example 1. FIG. 15 illustrates results obtained by performing harmonic analysis of the induced voltage waveforms of FIG. 14.

As illustrated in FIG. 14, it is understood that the induced voltage waveform of the rotating electrical machine of the present embodiment more closely resembles the sine wave than the induced voltage waveform of the rotating electrical machine of Comparative Example 1. In addition, it has been found that particularly fifth-order and seventh-order harmonic components can be reduced in the present embodiment as compared with Comparative Example 1 as illustrated in the harmonic analysis results of FIG. 15.

Figure 16:
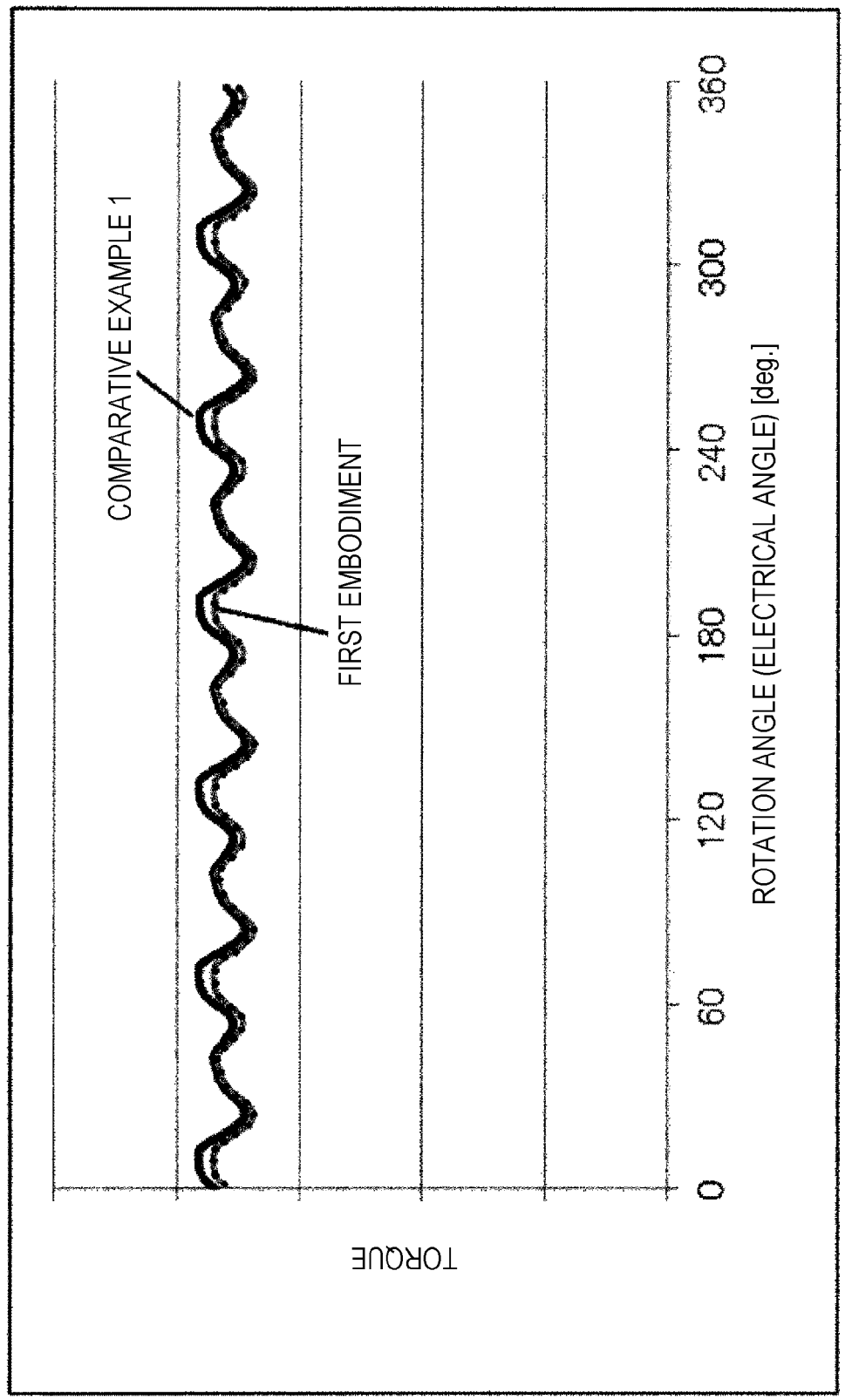
FIG. 16 is a graph illustrating torque waveforms when an alternating current is applied in comparison between the embodiment and Comparative Example 1.
Figure 17:
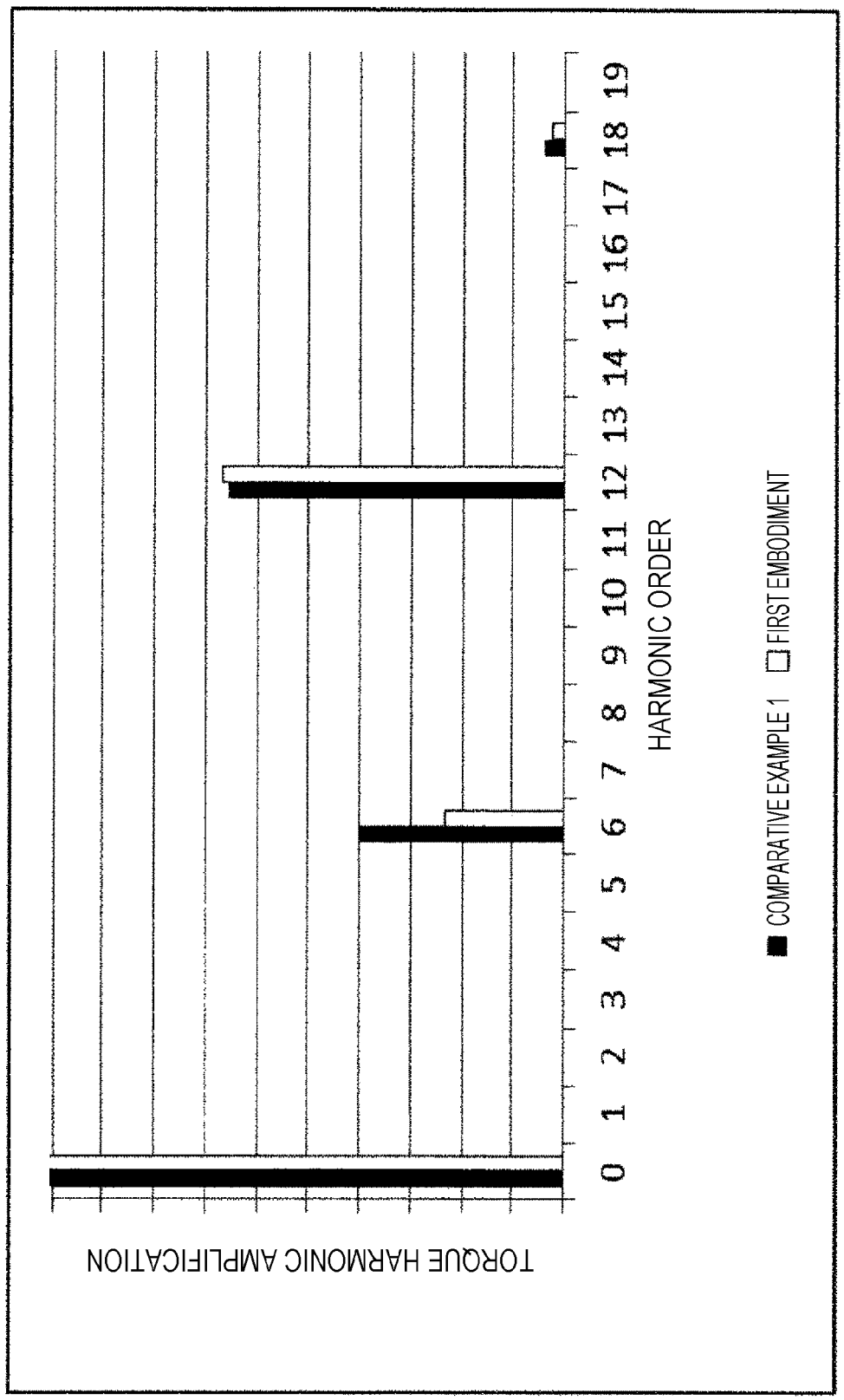
FIG. 17 is a graph illustrating a harmonic analysis result of each torque waveform illustrated in FIG. 16.

In addition, FIG. 16 illustrates torque waveforms obtained when supplying the alternating current in the case of the rotating electrical machine of the present embodiment and the case of the rotating electrical machine of Comparative Example 1. FIG. 17 illustrates results obtained by performing harmonic analysis of the respective torque waveforms illustrated in FIG. 16. It has been found that particularly a sixth-order torque ripple can be reduced as illustrated in the harmonic analysis results of FIG. 17. This indicates that the induced voltage, that is, fifth-order and seventh-order components of the interlinkage magnetic flux, has been reduced by arranging the slot conductor 233a such that the straddling amount Npj of the jumper wire includes (N+1) slot pitches and {(N+1)±1} slot pitches as illustrated in FIGS. 7 to 11 as for the winding arrangement.

Figure 18:
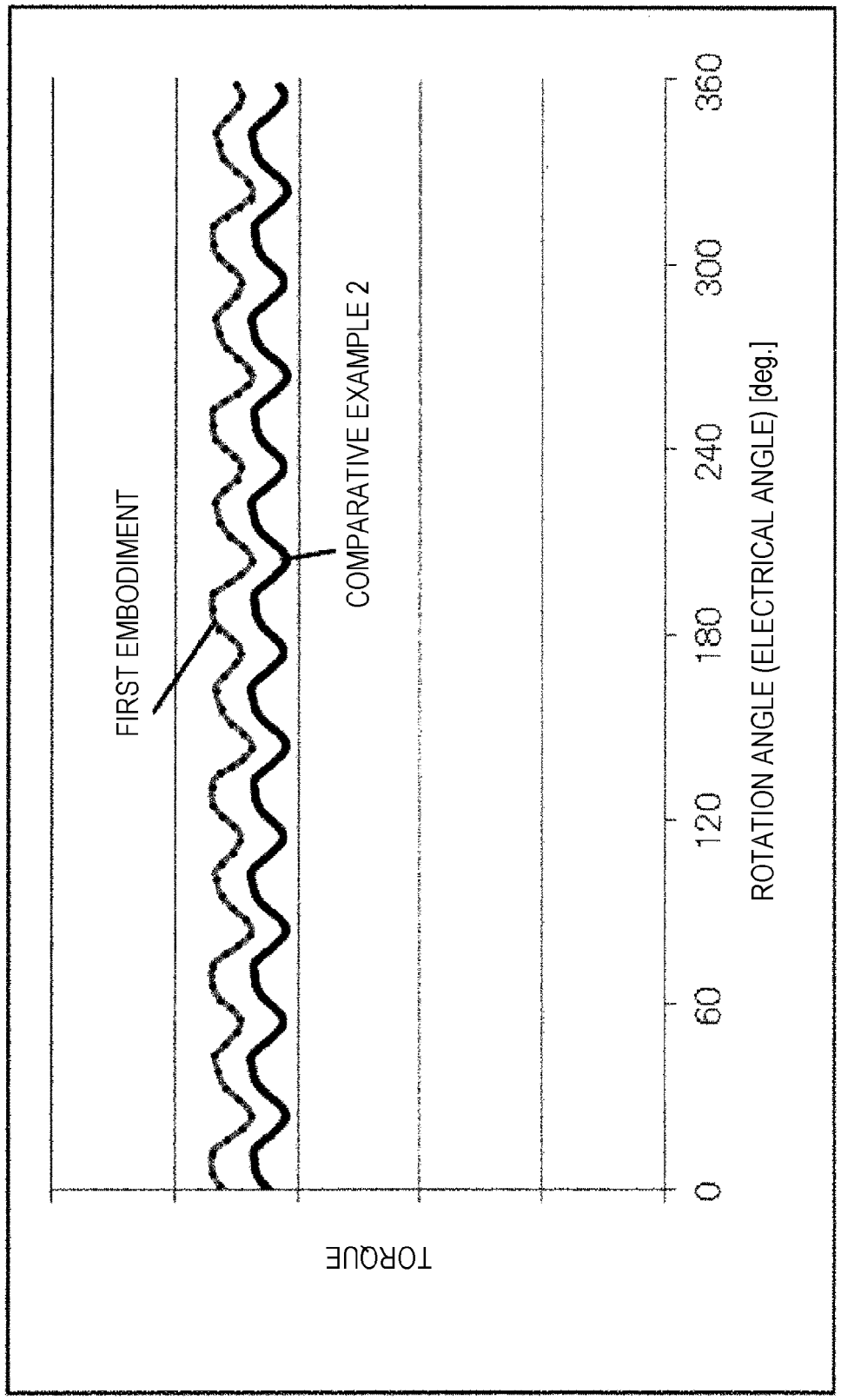
FIG. 18 is a graph illustrating torque waveforms when an alternating current is applied in comparison between the embodiment and Comparative Example 2.
Figure 19:
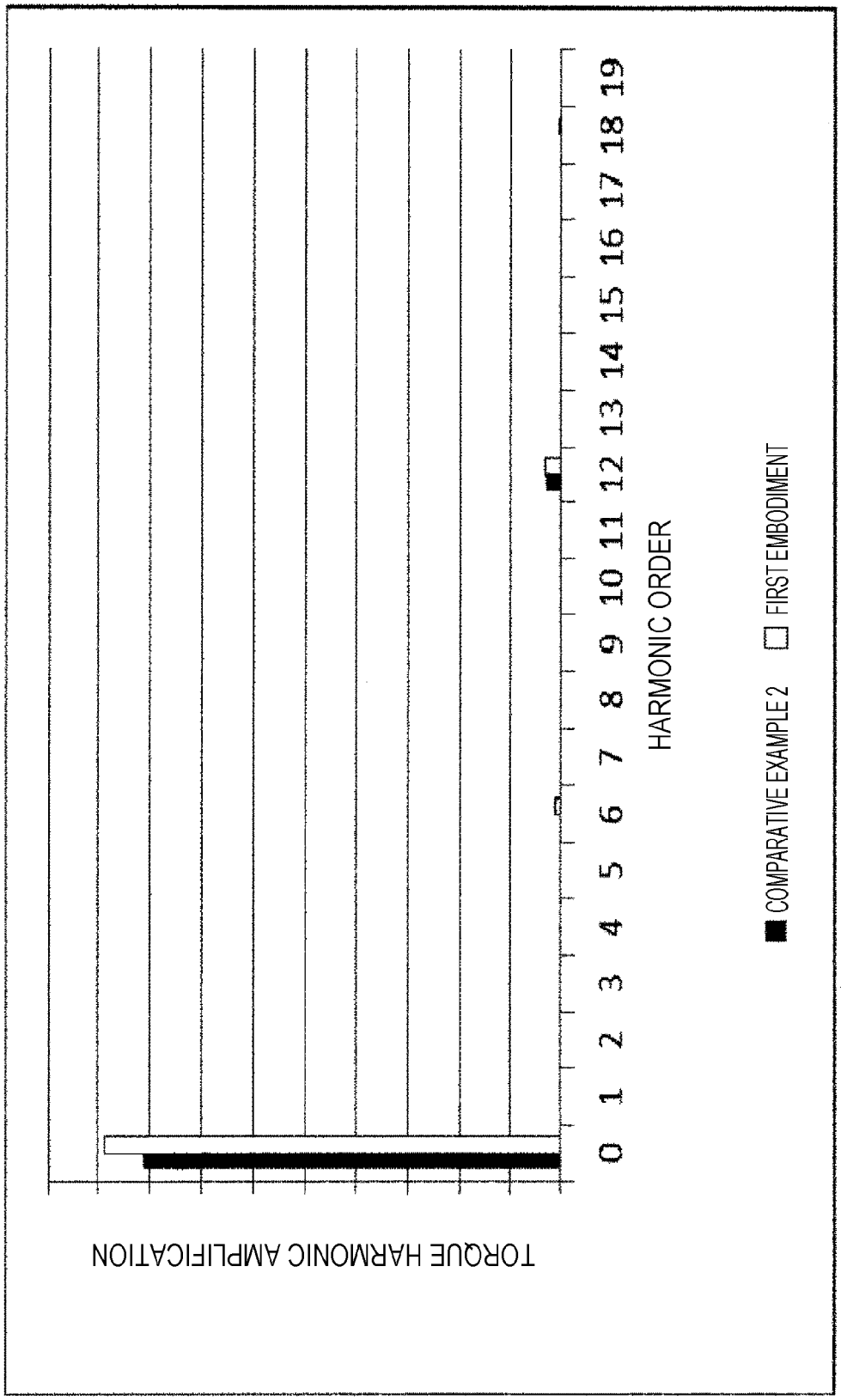
FIG. 19 is a graph illustrating a harmonic analysis result of each torque waveform illustrated in FIG. 18.

FIGS. 18 and 19 illustrate the operational effect of the present invention in comparison with the operational effect of Comparative Example 2. FIG. 18 illustrates torque waveforms obtained when supplying the alternating current in the case of the rotating electrical machine of the present embodiment and the case of the rotating electrical machine of Comparative Example 2. In addition, FIG. 19 illustrates results obtained by performing harmonic analysis of the respective torque waveforms illustrated in FIG. 18. As illustrated in FIGS. 18 and 19, it has been found that an average torque is large in the present embodiment as compared with Comparative Example 2.

As described above, according to the present embodiment, it is possible to obtain a rotating electrical machine having torque ripple smaller than that of Comparative Example 1 and lower noise, and having an average torque larger than that of Comparative Example 2. In this sense, according to the rotating electrical machine of the present embodiment, it is possible to obtain a rotating electrical machine with a high torque and low noise. In addition, in a vehicle equipped with such a rotating electrical machine, it is possible to achieve a high torque and low noise.

<Modification 1>

Figure 21:
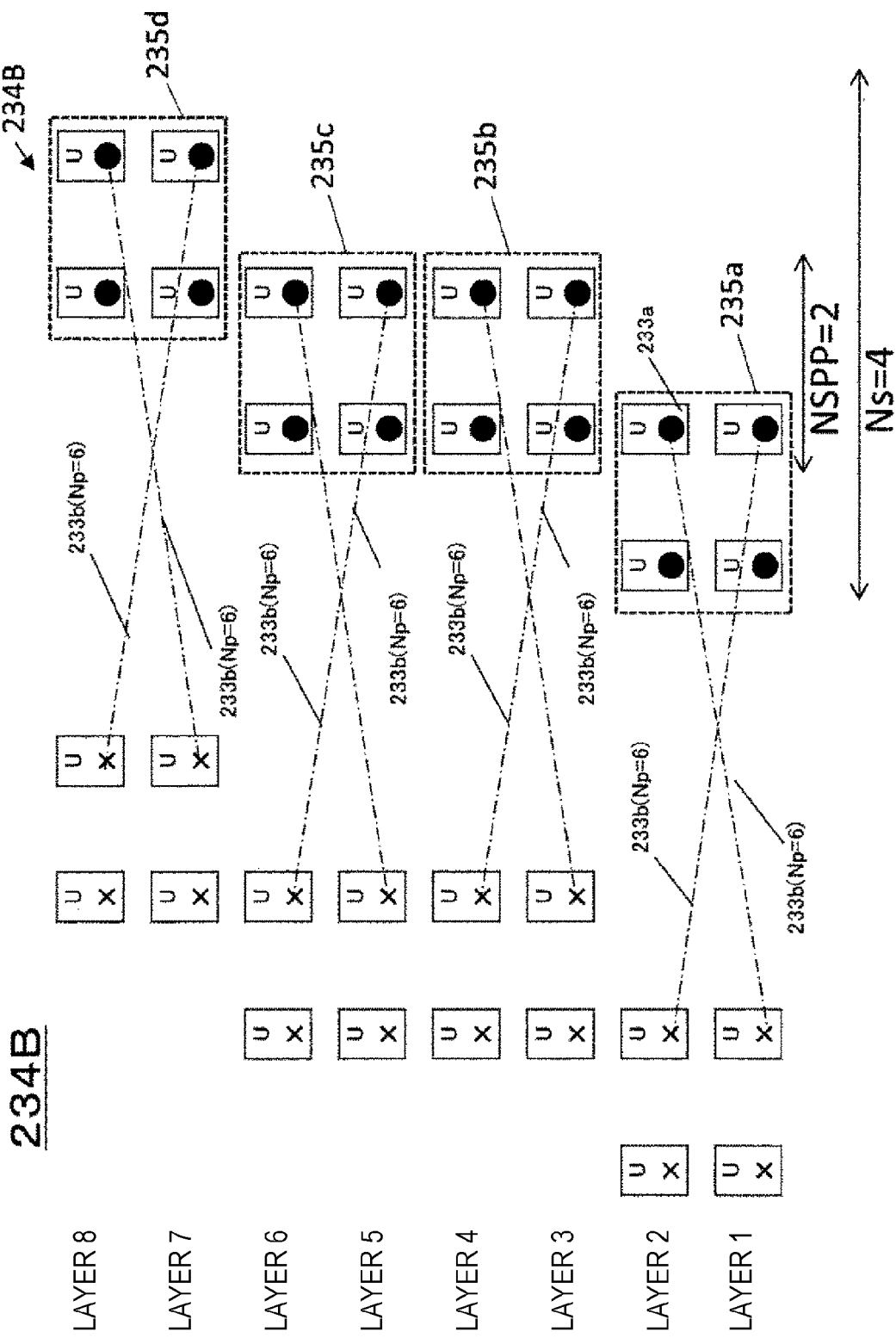
FIG. 21 is a diagram illustrating Modification 1.

FIG. 21 is a diagram illustrating Modification 1 of the above-described embodiment and illustrates a slot conductor group 234B. In Modification 1, a number N of slots per pole is six, NSPP is two, and the number of layers is eight. A difference from the above-described embodiment is that the number of layers is eight. When the number of layers is eight, the slot conductor group 234B is constituted by four slot conductor subgroups 235a to 235d.

In Modification 1, each of slot conductor subgroups 235b and 235c is shifted with respect to a slot conductor subgroup 235a by one slot pitch to the right side in the drawing. Further, a slot conductor subgroup 235d is shifted with respect to each of the slot conductor subgroups 235b and 235c by one slot pitch to the right side in the drawing. Thus, each of a jumper wire connecting a slot conductor 233a of a layer 2 and a slot conductor 233a of a layer 3 and a jumper wire connecting a slot conductor 233a of a layer 6 and a slot conductor 233a of a layer 7 has a straddling amount Npj of six slot pitches. On the other hand, a straddling amount Npj of a jumper wire connecting a slot conductor 233a of a layer 4 and a slot conductor 233a of a layer 5 is seven slot pitches.

That is, a plurality of round windings constituting U-phase (U1 phase and U2 phase) stator windings are connected via the jumper wire having the straddling amount Npj of (N+1) slot pitches and the jumper wire with {(N+1)−1} slot pitches when the number N of slots per pole is six. At this time, since the number (2×NJ) of the jumper wires with {(N+1)−1} slot pitches per phase is 4, NJ=2, and it is understood that Ns=NSPP+NJ is set.

Even in Modification 1, each phase winding is configured so as to include the jumper wire having the straddling amount Npj of (N+1) slot pitches and the jumper wire with {(N+1)−1} slot pitches, and thus, it is possible to achieve effects that a torque ripple is smaller and noise is lower as compared with Comparative Example 1 and an average torque is larger as compared with Comparative Example 2, which is similar to the above-described embodiment.

<Modification 2>

Figure 22:
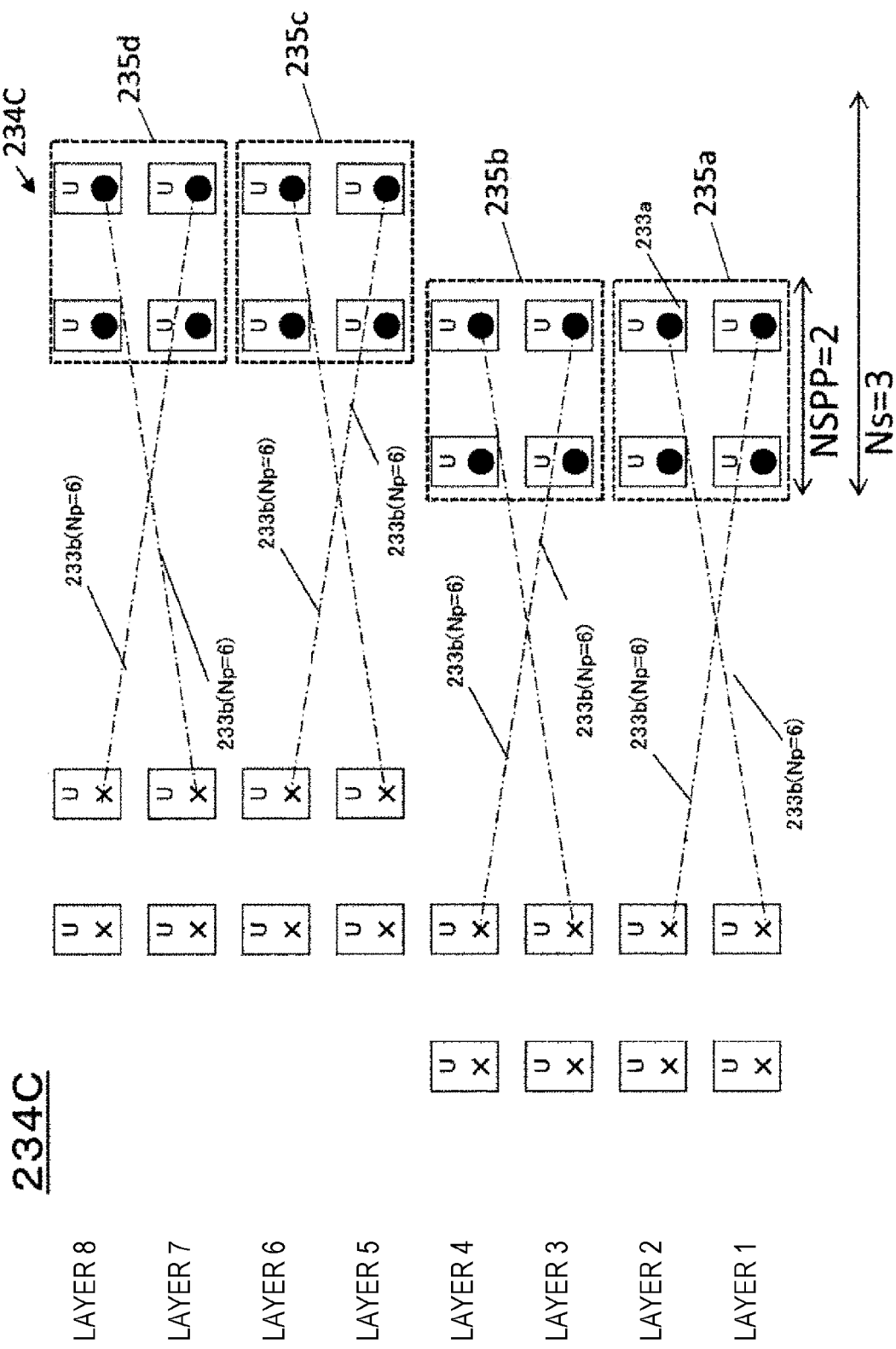
FIG. 22 is a diagram illustrating Modification 2.

FIG. 22 is a diagram illustrating a slot conductor group 234C in Modification 2. Modification 2 is set such that a number N of slots per pole=6, NSPP=2, and the number of layers=8. In Modification 2, slot conductor subgroups 235c and 235d are shifted with respect to the slot conductor subgroups 235a and 235b by one slot pitch to the right side in the drawing. Thus, a straddling amount Npj of a jumper wire connecting a slot conductor 233a of a layer 4 and a slot conductor 233a of a layer 5 is set to six slot pitches, and each straddling amount Npj of a jumper wire connecting a slot conductor 233a of a layer 2 and a slot conductor 233a of a layer 3 and a jumper wire connecting a slot conductor 233a of a layer 6 and a slot conductor 233a of a layer 7 is set to seven slot pitches.

Even in the case of Modification 2, the number N of slots per pole is set to N=6, the jumper wire having the straddling amount Npj of (N+1) slot pitches and the jumper wire with the {(N+1)−1} slot pitches are included. In addition, since the number (2×NJ) of jumper wires having the straddling amount Npj of {(N+1)−1} slot pitches per phase is two, NJ=1 in Modification 2. Thus, Ns=NSPP+NJ is satisfied when a predetermined number Ns of slots=3.

In this manner, even in Modification 1, each phase winding is configured so as to include the jumper wire having the straddling amount Npj of (N+1) slot pitches and the jumper wire with {(N+1)−1} slot pitches, and thus, it is possible to achieve effects that a torque ripple is smaller and noise is lower as compared with Comparative Example 1 and an average torque is larger as compared with Comparative Example 2, which is similar to the above-described embodiment. Incidentally, it may be configured such that the slot conductor subgroup 235d is shifted with respect to the slot conductor subgroups 235a and 235b by two slot pitches to the right side in the drawing so as to provide three kinds of jumper wires.

<Modification 3>

Figure 23:
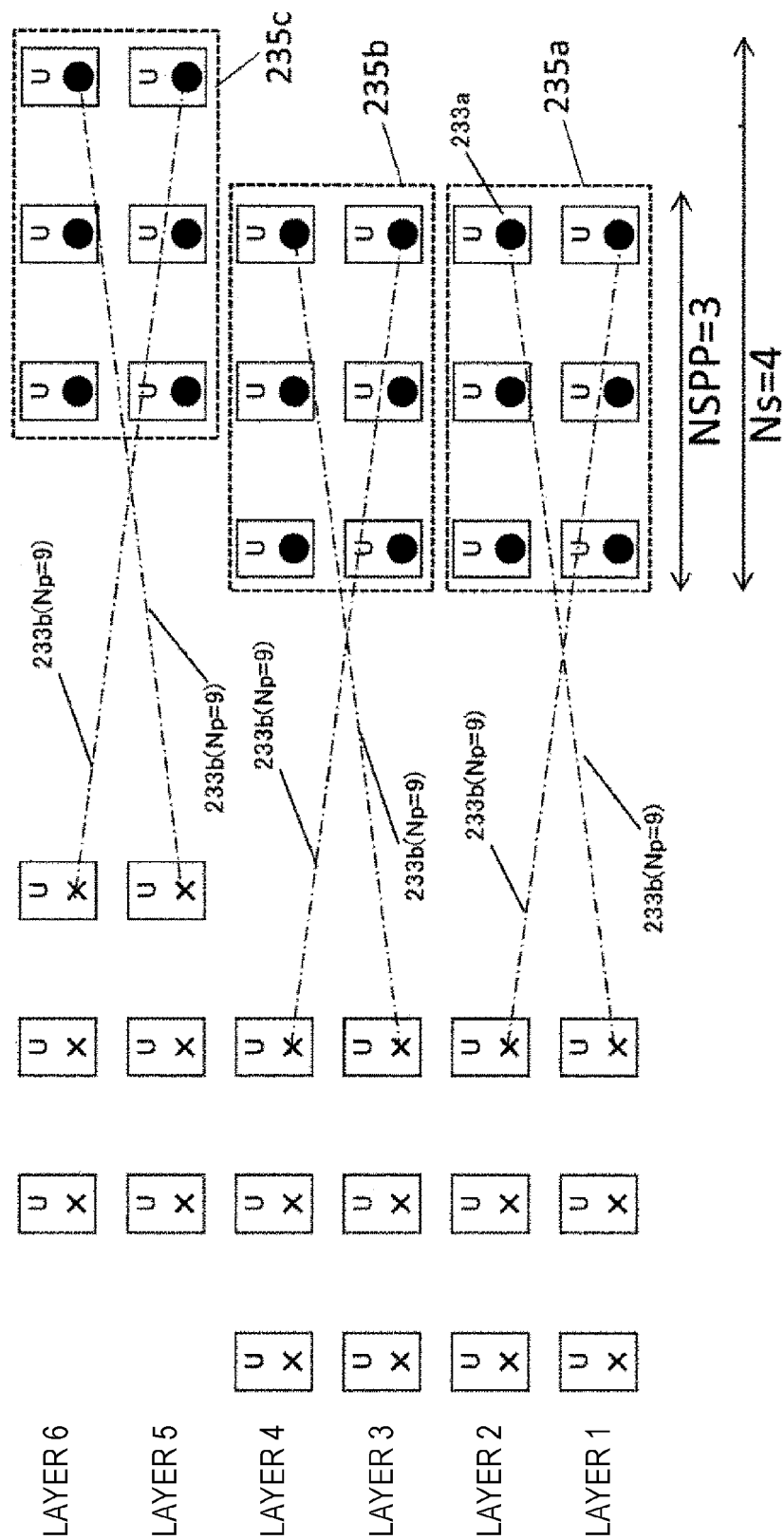
FIG. 23 is a diagram illustrating Modification 3.

FIG. 23 is a view illustrating a slot conductor group 234D in Modification 3. Modification 3 is set such that a number N of slots per pole=9, NSPP=3, and the number of layers=6, and is different from the above-described embodiment in terms that the number of slots per pole is nine and the NSPP is three. Thus, each of slot conductor subgroups 235a, 235b, and 235c includes six slot conductors 233a.

In Modification 3 illustrated in FIG. 23, circumferential directions of the slot conductor subgroups 235a and 235b coincide with each other, and the slot conductor subgroup 235c is shifted with respect to the slot conductor subgroups 235a and 235b by one slot pitch to the right side in the drawing. Thus, a straddling amount Npj of a jumper wire connecting a slot conductor 233a of a layer 4 and a slot conductor 233a of a layer 5 is {(N+1)−1} slot pitches, and a straddling amount Npj of a jumper wire connecting a slot conductor 233a of a layer 2 and a slot conductor 233a of a layer 3 is (N+1) slot pitches. Since the number of slots per pole is N=9 in the case of Modification 3, {(N+1)−1} is nine and (N+1) is ten. In addition, since a number (2×NJ) of jumper wires having the straddling amount Npj of {(N+1)−1} slot pitches per phase is two, NJ=1. In the Modification 3, Ns=NSPP+NJ is satisfied since NSPP=3 and NJ=1 although a predetermined number Ns of slots is Ns=4.

In this manner, even in Modification 3, each phase winding is configured so as to include the jumper wire having the straddling amount Npj of (N+1) slot pitches and the jumper wire with {(N+1)−1} slot pitches, and thus, it is possible to achieve effects that a torque ripple is smaller and noise is lower as compared with Comparative Example 1 and an average torque is larger as compared with Comparative Example 2, which is similar to the above-described embodiment.

As described above, the rotating electrical machine of the present embodiment has the following configuration and achieves the following operational effects. (1) The stator winding 238 in the rotating electrical machine 200 (the same description is applied for the rotating electrical machine 202) has the plurality of round windings wound in a wave winding such that the slot conductor 233a which is the winding conductor, is inserted through each of the plurality of slots 237 in six layers or more. As illustrated in FIGS. 9 and 10, the stator winding 238 has the plurality of jumper wires connecting the round windings, inserted through different layers, to each other. Then, when the number of slots per pole is N, the plurality of jumper wires include the jumper wire J1 having the straddling amount Npj of (N+1) slot pitches at the time of connecting the round windings to each other while straddling the slots 237 and the jumper wire J2 with {(N+1)±1} slot pitches.

In the case of including the above-described jumper wires J1 and J2, the slot conductor group 234 constituted by the plurality of slot conductors 233a of the same phase is constituted by the slot conductor subgroup 235b which is not shifted in the circumferential direction of the stator core and the slot conductor subgroup 235a which is shifted in the circumferential direction by one slot pitch as illustrated in FIG. 13. With such a configuration, according to the rotating electrical machine of the present embodiment, it is possible to obtain a rotating electrical machine with a high torque and low noise. In addition, in a vehicle equipped with such a rotating electrical machine, it is possible to achieve a high torque and low noise.

(2) In addition, in the above-described configuration, Ns=NSPP+NJ is satisfied when the predetermined number of slots is Ns, the number of slots per phase per pole is NSPP, and the number of jumper wires having the straddling amount Npj of {(N+1)±1} slot pitches per phase is 2×NJ. That is, it is possible to achieve the high torque and low noise of the rotating electrical machine with such a configuration.

<Modification 4>

Figure 24:
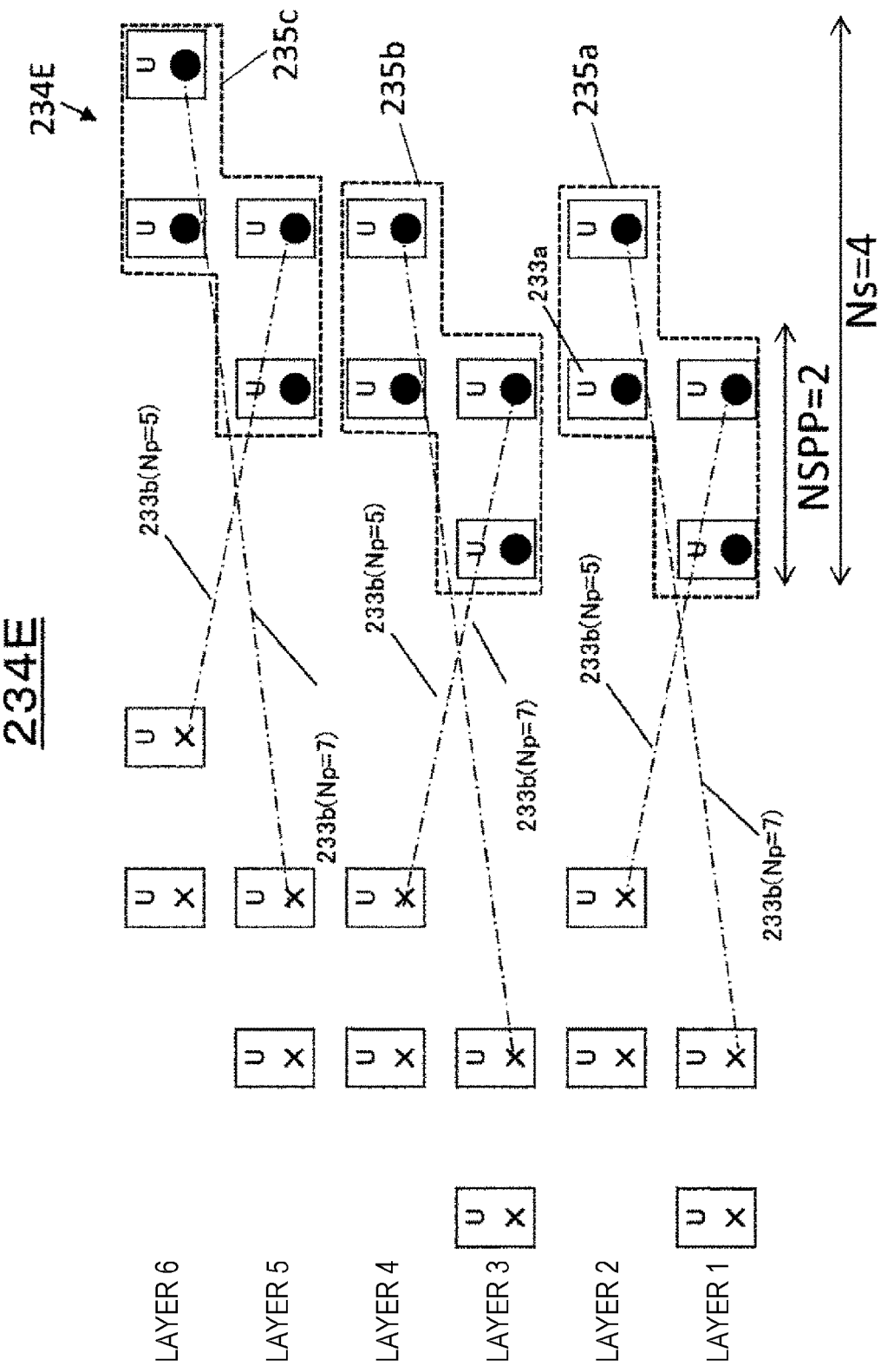
FIG. 24 is a diagram illustrating Modification 4.

FIG. 24 is a diagram illustrating a slot conductor group 234E in Modification 4. Modification 4 is set such that a number N of slots per pole=6, NSPP=2, and a number (2×NL) of layers=6. When the number of layers is six, NL=3. In the slot conductor group 234E illustrated in FIG. 24, outer layers of slot conductor subgroups 235a to 235c are shifted with respect to inner layers thereof by one slot pitch in a rotation direction (right direction in the drawing) Thus, a straddling amount Np of a cross conductor 233b on a coil end side (lower side in the drawing) where a lead wire is led out in a round winding is seven slot pitches, and a straddling amount Np of a cross conductor 233b on a coil end side on the opposite side (upper side in the drawing) is five slot pitches. Modification 4 is different from the above-described embodiment and Modifications 1 to 3 in terms that the round windings are wound in such a wave winding with irregular slot pitches.

In Modification 4, positions of a slot conductor 233a of a layer 4 and a slot conductor 233a of a layer 5 coincide with each other in the circumferential direction. Thus, a straddling amount Npj of a jumper wire connecting the slot conductor 233a of the layer 4 and the slot conductor 233a of the layer 5 is set to (N+1) slot pitches when the number of slots per pole is N. On the other hand, a slot conductor 233a of a layer 3 is shifted from a slot conductor 233a of a layer 2 by one slot pitch to the left side in the drawing. Thus, a straddling amount Npj of a jumper wire connecting the slot conductor 233a of the layer 2 and the slot conductor 233a of the layer 3 is set to {(N+1)+1} slot pitches.

In Modification 4, (N+1) is seven and {N+1}+1 is eight since the number N of slots per pole is six. In addition, since a number (2×NJ) of jumper wires having the straddling amount Npj of {(N+1)−1} slot pitches per phase is two, NJ=1.

In Modification 4, the round windings are wound in a wave winding with irregular slot pitches, and a predetermined number Ns of slots is four. In the case of such irregular slot pitches, an expression "Ns=NSPP+NL−NJ" is satisfied instead of the above-described expression "Ns=NSPP+NL". Here, NSPP is the number of slots per phase per pole, 2×NL is the number of layers, 2×NJ is the number of jumper wires having the straddling amount Npj of {(N+1)+1} slot pitches per phase.

Even in the configuration as in Modification 4, it is possible to achieve effects that a torque ripple is smaller and noise is lower as compared with Comparative Example 1 and an average torque is larger as compared with Comparative Example 2, which is similar to the above-described embodiment.

<Modification 5>

Figure 25:
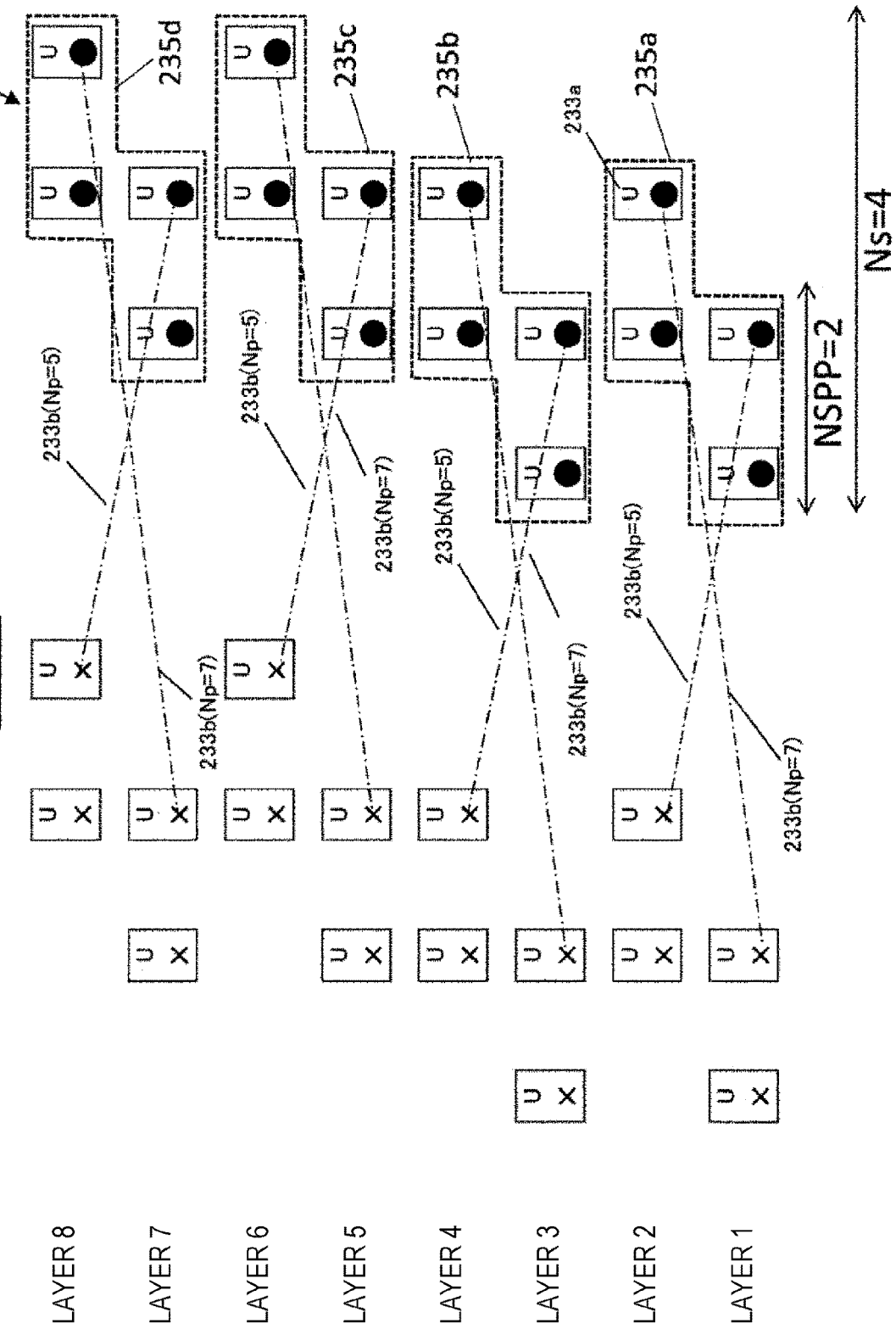
FIG. 25 is a diagram illustrating Modification 5.

FIG. 25 is a diagram illustrating a slot conductor group 234F in Modification 5. Although the number of layers is six in the above-described modifications, the number of layers is eight in Modification 5. That is, a round winding is wound in a wave winding with irregular slot pitches in Modification 5, and it is set such that a number N of slots per pole=6, NSPP=2, and a number (2×NL) of layers=8.

As illustrated in FIG. 25, a slot conductor 233a of a layer 3 is shifted with respect to a slot conductor 233a of a layer 2 by one slot pitch to the left side in the drawing, and thus, a straddling amount Npj of a jumper wire is {(N+1)+1} slot pitches when the number of slots per pole is N. Similarly, a jumper wire connecting a layer 6 and a layer 7 has a straddling amount Npj of {(N+1)+1} slot pitches. On the other hand, positions of a slot conductor 233a of a layer 4 and a slot conductor 233a of a layer 5 coincide with each other in the circumferential direction, and thus a straddling amount Npj of a jumper wire connecting the layer 4 and the layer 5 is (N+1). In Modification 5, {(N+1)+1} is eight and (N+1) is seven since the number N of slots per pole is six.

In addition, since a number (2×NJ) of jumper wires having the straddling amount Npj of {(N+1)+1} slot pitches per phase is four, NJ=2. A predetermined number Ns of slots continuously arranged in the circumferential direction of the stator core is four as illustrated in FIG. 25, and thus Ns=NSPP+NL−NJ is satisfied even in the case of the configuration of Modification 5. With such a configuration, it is possible to achieve effects that a torque ripple is smaller and noise is lower as compared with Comparative Example 1 and an average torque is larger as compared with Comparative Example 2.

<Modification 6>

Figure 26:
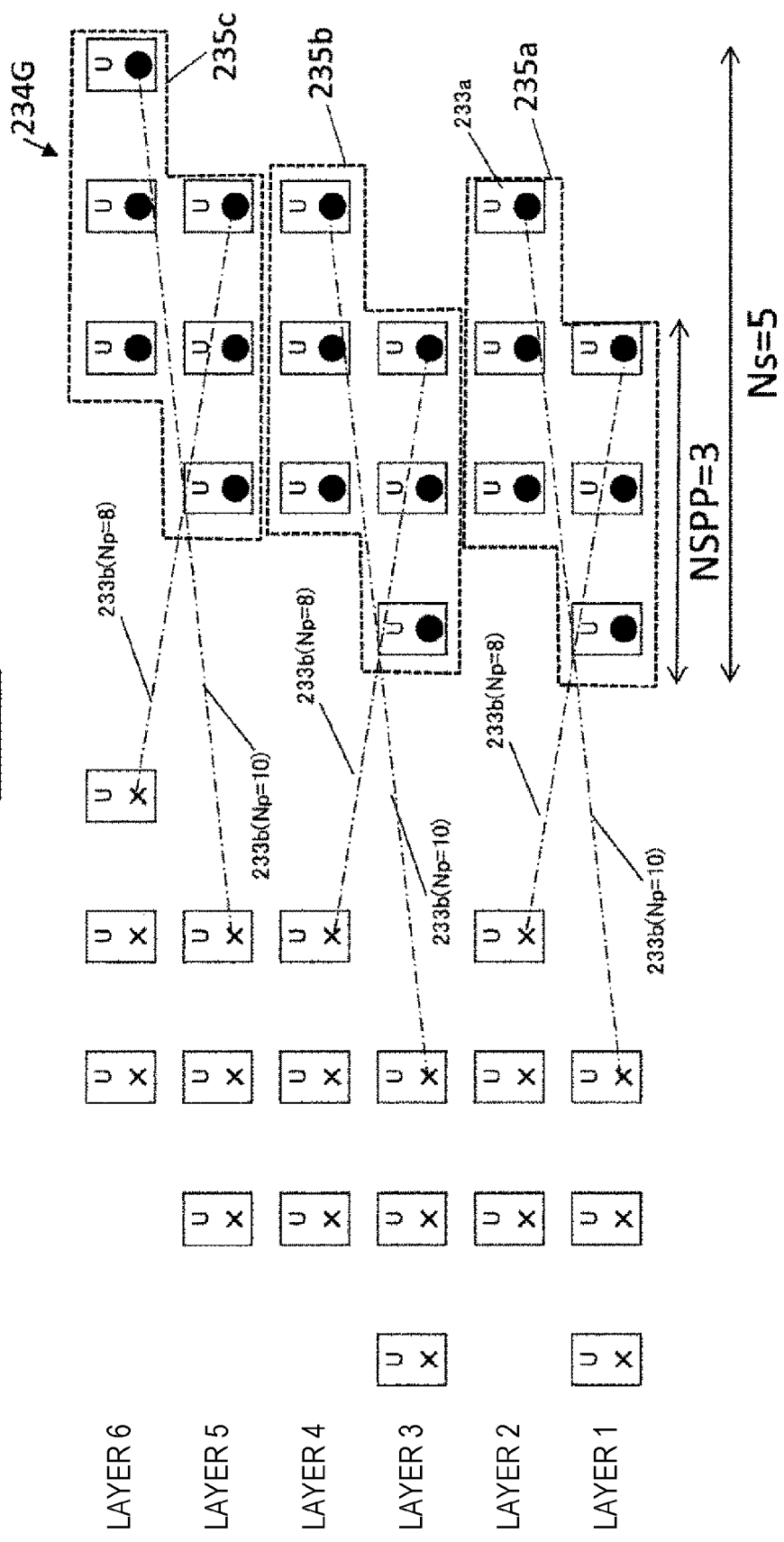
FIG. 26 is a diagram illustrating Modification 6.

FIG. 26 is a diagram illustrating a slot conductor group 234G in Modification 6. In Modification 6, a round winding is wound in a wave winding with irregular slot pitches, and it is set such that a number N of slots per pole=9, NSPP=3, and a number (2×NL) of layers=6. Each of slot conductor subgroups 235a to 235c has six slot conductors 233a.

Positions of the slot conductor subgroups 235a and 235b coincide with each other in the circumferential direction, and the slot conductor subgroup 235c is shifted with respect to the slot conductor subgroup 235b by one slot pitch to the right side in the drawing. Thus, a slot conductor 233a of a layer 3 is shifted from a slot conductor 233a of a layer 2 by one slot pitch to the left side in the drawing. Positions of a slot conductor 233a of a layer 4 and a slot conductor 233a of a layer 5 coincide with each other in the circumferential direction.

As a result, a straddling amount Npj of a jumper wire connecting the layer 2 and the layer 3 is {(N+1)+1} slot pitches and a straddling amount Npj of a jumper wire connecting the layer 4 and the layer 5 is (N+1) slot pitches. In Modification 26, {(N+1)+1} is eleven and (N+1) is ten since the number N of slots per pole is nine. In this manner, the straddling amount Npj of the jumper wire includes {(N+1)+1} slot pitches and (N+1) slot pitches.

In addition, since a number (2×NJ) of jumper wires having the straddling amount Npj of {(N+1)+1} slot pitches per phase is two, NJ=1. A predetermined number Ns of slots continuously arranged in the circumferential direction of the stator core is five, and thus Ns=NSPP+NL−NJ is satisfied. Even in the case of Modification 6, it is possible to achieve effects that a torque ripple is smaller and noise is lower as compared with Comparative Example 1 and an average torque is larger as compared with Comparative Example 2.

(3) In the rotating electrical machine according to Modificationas 4 to 6 described above, the stator winding 238 has the plurality of slot conductor groups 234, each group being constituted by the plurality of slot conductors 233a corresponding to the same phase, and the plurality of slot conductors 233a constituting the slot conductor group 234 are inserted such that the slots and layers are adjacent to each other inside the predetermined number Ns of slots 237 continuously arranged in the circumferential direction of the stator core. Further, when the number of slots per phase per pole is defined as NSPP, the number of layers is defined as 2×NL, and the number of jumper wires with {(N+1)±1} per phase is defined as 2×NJ, the predetermined number Ns satisfies the expression "Ns=NSPP+NL−NJ".

That is, it is possible to achieve the high torque and low noise of the rotating electrical machine by configuring the stator such that Ns=NSPP+NL−NJ.

Although the description has been given using the examples of NSPP=2 or 3, the number of layers=6 or 8, and the typical round winding or the round winding wound in a wave winding with irregular slot pitches in the above-described embodiment and modifications, the present invention is not limited thereto. The invention can be similarly applied to three or more NSPP, an even number of layers of eight or more, or windings having both the typical round winding and the round winding wound in a wave winding with irregular slot pitches, and the similar effects are achieved.

Although various embodiment and modifications have been described as above, the present invention is not limited to these contents. Other embodiments conceivable within a technical idea of the present invention are also included within the scope of the present invention.

REFERENCE SIGNS LIST 100 vehicle
180 battery
200, 202 rotating electrical machine
230 stator
232 stator core
233a slot conductor
233b cross conductor
234, 234B to 234G slot conductor group
235, 235a to 235d slot conductor subgroup
237 slot 238 stator winding
250 rotor
600 power conversion device
J1, J2 jumper wire
V11 to V16, V21 to V26, W11 to W16, W21 to W26, U11 to U16, U21 to U26 round winding

The invention claimed is:

1. A stator for a rotating electrical machine in which six or more slot conductors are inserted through one slot, the stator for a rotating electrical machine straddling slots such that a slot pitch of a jumper wire connecting round windings having different positions in a radial direction has at least two kinds or more different slot pitches, wherein
   there are at least two jumper wires, and
   a first jumper wire of the at least two jumper wires has a straddling amount of N+1 slot pitches and a second jumper wire of the at least two jumper wires has a straddling amount of {(N+1)±1} slot pitches, when N is defined as a number of slots per pole.

2. The stator for a rotating electrical machine according to claim 1, the rotating electrical machine comprising
   a plurality of slot conductor groups each group constituted by a plurality of winding conductors of an identical phase,
   wherein the plurality of the winding conductors constituting the slot conductor group are inserted such that slots and layers are adjacent to each other inside a predetermined number of slots (Ns) continuously arranged in a circumferential direction of a stator core, and
   when a number of slots per phase per pole is defined as NSPP and a number of the at least two jumper wires with the {(N+1)±1} slot pitches per phase is defined as 2×NJ, and
   the predetermined number of slots (Ns) is set to satisfy an expression "Ns=NSPP+NJ".

3. The stator for a rotating electrical machine according to claim 1, comprising:
   a plurality of slot conductor groups, each group constituted by a plurality of winding conductors corresponding to an identical phase,
   wherein the plurality of the winding conductors constituting the slot conductor group are inserted such that slots and layers are adjacent to each other inside a predetermined number of slots (Ns) continuously arranged in a circumferential direction of a stator core, and
   when a number of slots per phase per pole is defined as NSPP, a number of layers is defined as 2×NL, and a number of the at least two jumper wires with the {(N+1)±1} slot pitches per phase is defined as 2×NJ, the predetermined number of slots (Ns) is set to satisfy an expression "Ns=NSPP+NL−NJ".

4. The stator for a rotating electrical machine according to claim 1, wherein
   the round winding is configured by connecting a plurality of segment conductors.

5. The stator for a rotating electrical machine according to claim 1, wherein
   the round winding is a flat rectangular wire.

6. The stator for a rotating electrical machine according to claim 1, comprising
   a plurality of three-phase Y connection wires having a plurality of the round windings,
   wherein each of the plurality of three-phase Y connection wires has no phase difference in voltage induced in windings of the respective three-phase Y connection wires corresponding to an identical phase.

7. A vehicle comprising:
   a rotating electrical machine having the stator for a rotating electrical machine according to claim 1;
   a battery that supplies DC power; and
   a conversion device that converts the DC power of the battery into AC power and supplies the converted power to the rotating electrical machine,
   the vehicle using a torque of the rotating electrical machine as a driving force.

* * * * *